(12) United States Patent
Izrailev et al.

(10) Patent No.: US 11,367,103 B2
(45) Date of Patent: Jun. 21, 2022

(54) METHOD FOR MODELING DIGITAL ADVERTISEMENT CONSUMPTION

(71) Applicant: Yieldmo, Inc., New York, NY (US)

(72) Inventors: Sergei Izrailev, New York, NY (US); Indu Narayan, New York, NY (US); Nathaniel Daly, New York, NY (US); Teddy Jawde, New York, NY (US); Maziar Hosseinzadeh, New York, NY (US); Ari Bernstein, New York, NY (US); Michael Yavonditte, New York, NY (US); Nisreen Al-Basha, New York, NY (US); Harsha Gorla, New York, NY (US)

(73) Assignee: Yieldmo, Inc., Nashua, NH (US)

( * ) Notice: Subject to any disclaimer, the term of this patent is extended or adjusted under 35 U.S.C. 154(b) by 0 days.

(21) Appl. No.: 17/190,133

(22) Filed: Mar. 2, 2021

(65) Prior Publication Data

US 2021/0272155 A1  Sep. 2, 2021

Related U.S. Application Data

(60) Provisional application No. 62/984,224, filed on Mar. 2, 2020.

(51) Int. Cl.
*G06Q 30/02* (2012.01)
*G06F 16/957* (2019.01)

(52) U.S. Cl.
CPC ..... *G06Q 30/0246* (2013.01); *G06F 16/9574* (2019.01); *G06Q 30/0243* (2013.01); *G06Q 30/0261* (2013.01); *G06Q 30/0277* (2013.01)

(58) Field of Classification Search
CPC .......... G06Q 30/0246; G06Q 30/0243; G06Q 30/0261; G06Q 30/0277; G06F 16/9574; G06F 16/958
See application file for complete search history.

(56) References Cited

U.S. PATENT DOCUMENTS

| 8,521,774 | B1 * | 8/2013 | Cai | G06F 16/24539 |
| | | | | 707/776 |
| 8,713,172 | B1 * | 4/2014 | Linsley | G06F 16/9577 |
| | | | | 709/224 |

(Continued)

*Primary Examiner* — Eric R Netzloff
(74) *Attorney, Agent, or Firm* — Run8 Patent Group, LLC; Peter Miller; Leah Raddatz

(57) ABSTRACT

One variation of a method for selectively serving advertising content comprises: receiving identification of an advertisement slot loaded within a webpage; receiving a set of advertisement slot characteristics corresponding to the advertisement slot; accessing a model associating advertisement slot characteristics and user interactions with advertisements; for each target outcome, in a set of target outcomes, calculating an outcome score for the advertisement slot based on the set of advertisement slot characteristics and the model, the outcome score representing a probability of the user interacting with advertising content, presented within the advertisement slot, according to the target outcome; in response to a first outcome score, corresponding to a first target outcome, in the set of target outcomes, exceeding each other outcome score, assigning the first target outcome to the advertisement slot; and selecting a first advertisement, designating the first target outcome, for presentation within the advertisement slot.

17 Claims, 4 Drawing Sheets

(56) References Cited

U.S. PATENT DOCUMENTS

| | | | |
|---|---|---|---|
| 9,875,969 B2* | 1/2018 | Braunisch | H01L 25/0652 |
| 9,912,768 B1* | 3/2018 | Choi | H04L 67/02 |
| 10,366,401 B1* | 7/2019 | Pearcy | G06Q 30/02 |
| 2008/0140508 A1* | 6/2008 | Anand | G06Q 30/02 |
| | | | 705/14.43 |
| 2009/0282343 A1* | 11/2009 | Catlin | G06F 16/9535 |
| | | | 715/738 |
| 2010/0257058 A1* | 10/2010 | Karidi | G06Q 30/02 |
| | | | 705/14.55 |
| 2013/0024283 A1* | 1/2013 | Axe | G06Q 30/0244 |
| | | | 705/14.54 |
| 2013/0138487 A1* | 5/2013 | Crasmaru | G06F 16/245 |
| | | | 705/14.4 |
| 2014/0052546 A1* | 2/2014 | Phan | G06Q 30/0277 |
| | | | 705/14.72 |
| 2014/0372205 A1* | 12/2014 | Ray | G06Q 30/0242 |
| | | | 705/14.45 |
| 2016/0358228 A1* | 12/2016 | Manavoglu | G06Q 30/0275 |
| 2017/0193561 A1* | 7/2017 | Shen | G06Q 30/0275 |
| 2017/0302979 A1* | 10/2017 | Kaya | G06Q 30/02 |
| 2018/0101862 A1* | 4/2018 | Ronquillo | G06Q 30/02 |
| 2018/0146263 A1* | 5/2018 | Doherty | H04N 21/26258 |
| 2018/0300748 A1* | 10/2018 | Flaks | G06Q 30/0243 |
| 2020/0034874 A1* | 1/2020 | Narayan | G06Q 30/0244 |

* cited by examiner

METHOD FOR MODELING DIGITAL ADVERTISEMENT CONSUMPTION

CROSS-REFERENCE TO RELATED APPLICATIONS

This Application claims the benefit of U.S. Provisional Application No. 62/984,224 filed on 2 Mar. 2020, which is incorporated in its entirety by this reference.

This Application is related to U.S. patent application Ser. No. 16/427,303 filed on 30 May 2019, and U.S. patent application Ser. No. 16/119,819 filed on 31 Aug. 2018, each of which is incorporated in its entirety by this reference.

TECHNICAL FIELD

This invention relates generally to the field of digital advertising and more specifically to a new and useful method for modeling digital advertisement consumption in the field of digital advertising.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
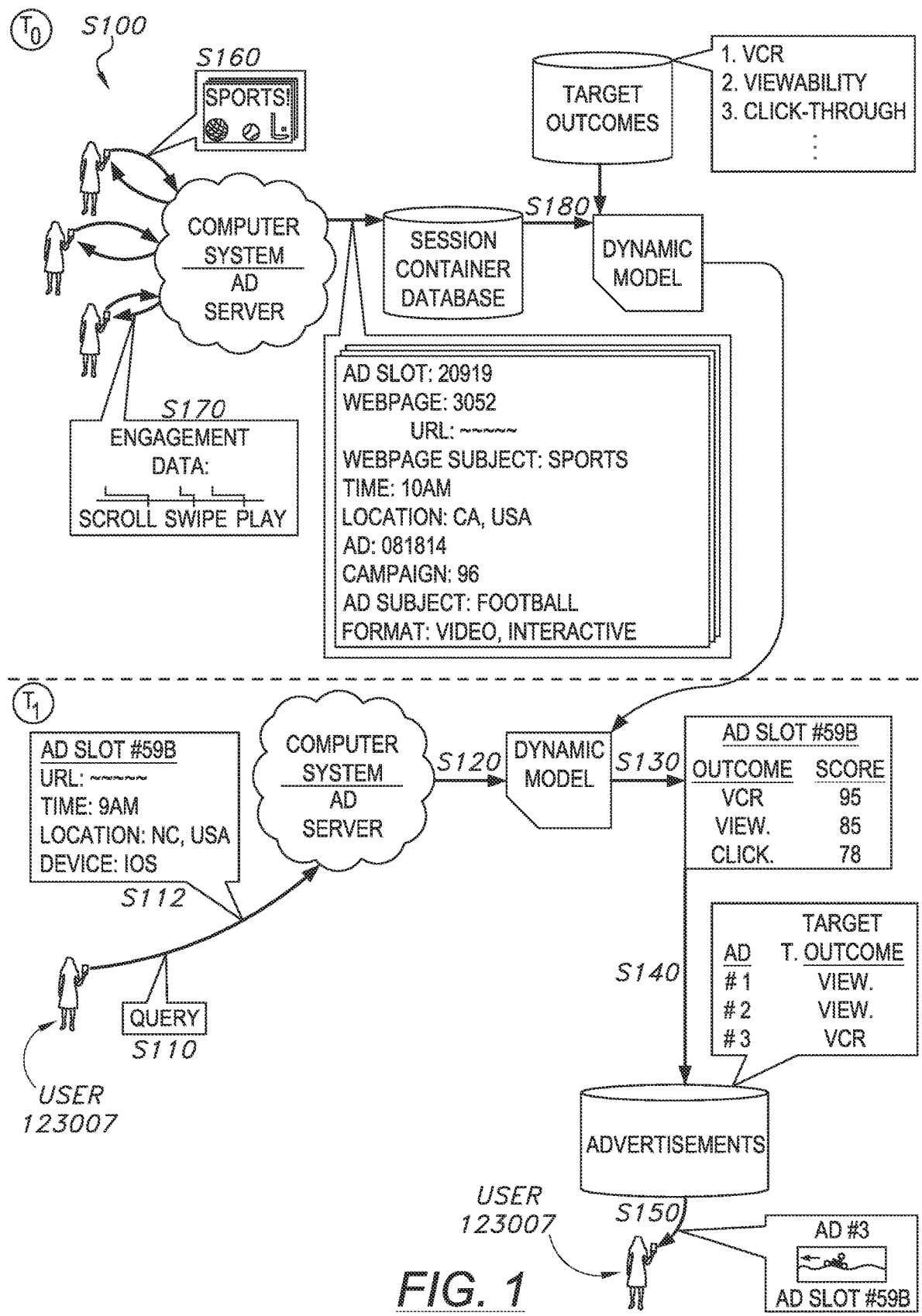
FIG. 1 is a flowchart representation of a method.
Figure 2:
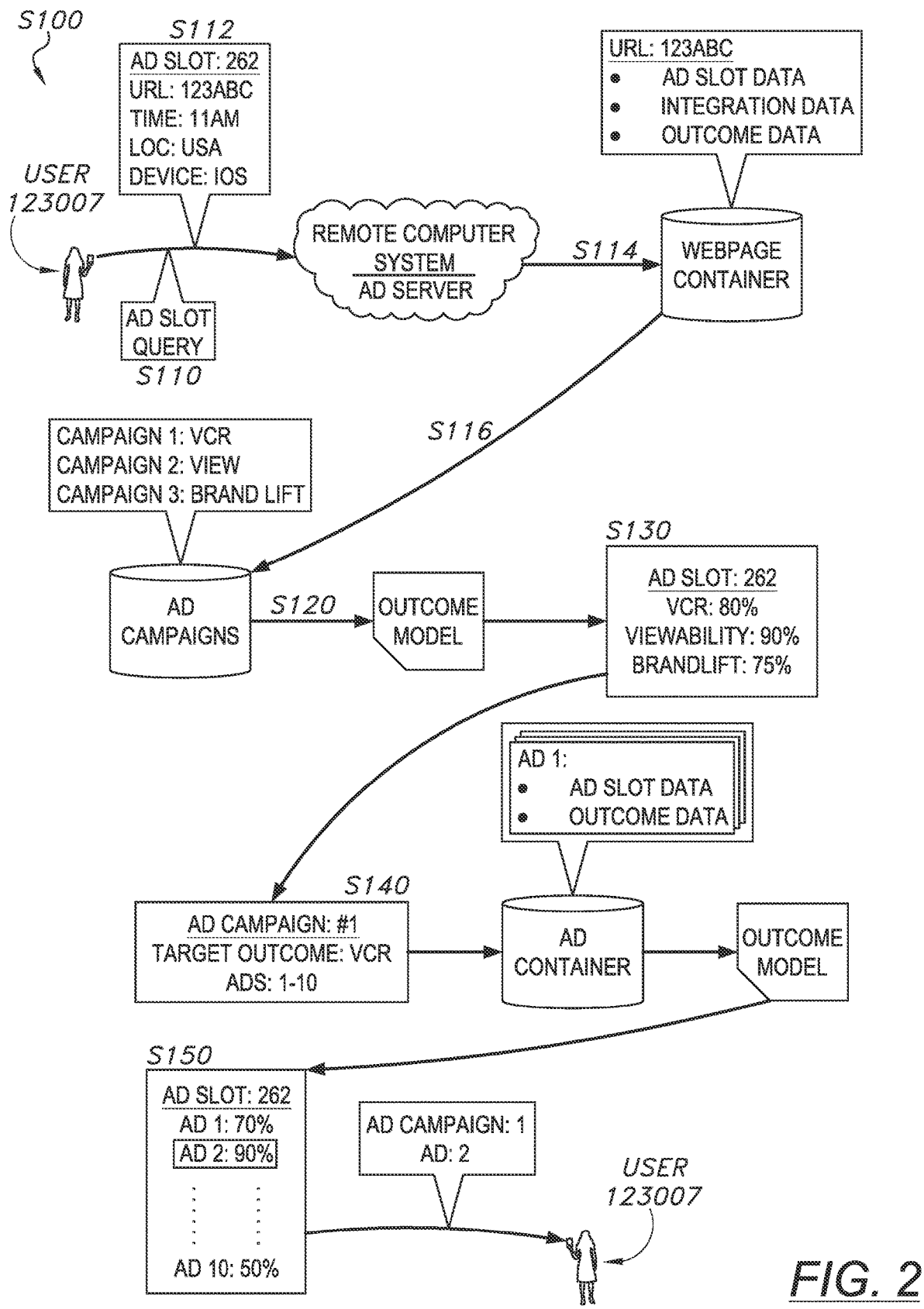
FIG. 2 is a flowchart representation of the method.

As shown in FIGS. 1 and 2, a method S100 for selectively serving advertising content to users includes: via a computer network, receiving identification of a first advertisement slot loaded within a first webpage accessed at a computing device in Block S110 (e.g., via an advertisement slot identification module); receiving a first set of advertisement slot characteristics including a first address of the first webpage and a location of the first advertisement slot within the first webpage in Block S112 (e.g., via an advertisement slot characterization module); accessing a first set of webpage data, stored in a webpage container, corresponding to the first webpage based on the first address in Block S114 (e.g., via a webpage extraction module); accessing a catalog of advertisements assigned to a set of webpages comprising the first webpage, each advertisement in the catalog of advertisements defining a target outcome representative of a set of target interactions for users interacting with the advertisement in Block S116 (e.g., via an advertisement extraction module); and accessing a model linking advertisement slot characteristics and webpage data to a set of target outcomes of advertisements in the catalog of advertisements in Block S120 (e.g., via a model extraction module).

The method S100 further includes, for each target outcome, in the set of target outcomes: calculating an outcome score based on the first set of advertisement slot characteristics, the first set of webpage data and the outcome model, the outcome score representing a probability of user engagement with advertising content, presented within the first advertisement slot, according to the target outcome in Block S130 (e.g., via an outcome score generation module); and inserting the outcome score into a first set of outcome scores for the first advertisement slot in Block S132 (e.g., via an outcome index generation module). The method S100 further includes, in response to a first outcome score, in the first set of outcome scores, exceeding each other outcome score in the first set of outcome scores: assigning a first target outcome corresponding to the first outcome score to the first advertisement slot in Block S140 (e.g., via a target outcome selection module); and selecting a first advertisement, in the catalog of advertisements, designating the first target outcome, for presentation within the first advertisement slot in Block S150 (e.g., via an advertisement selection module).

Figure 3A:
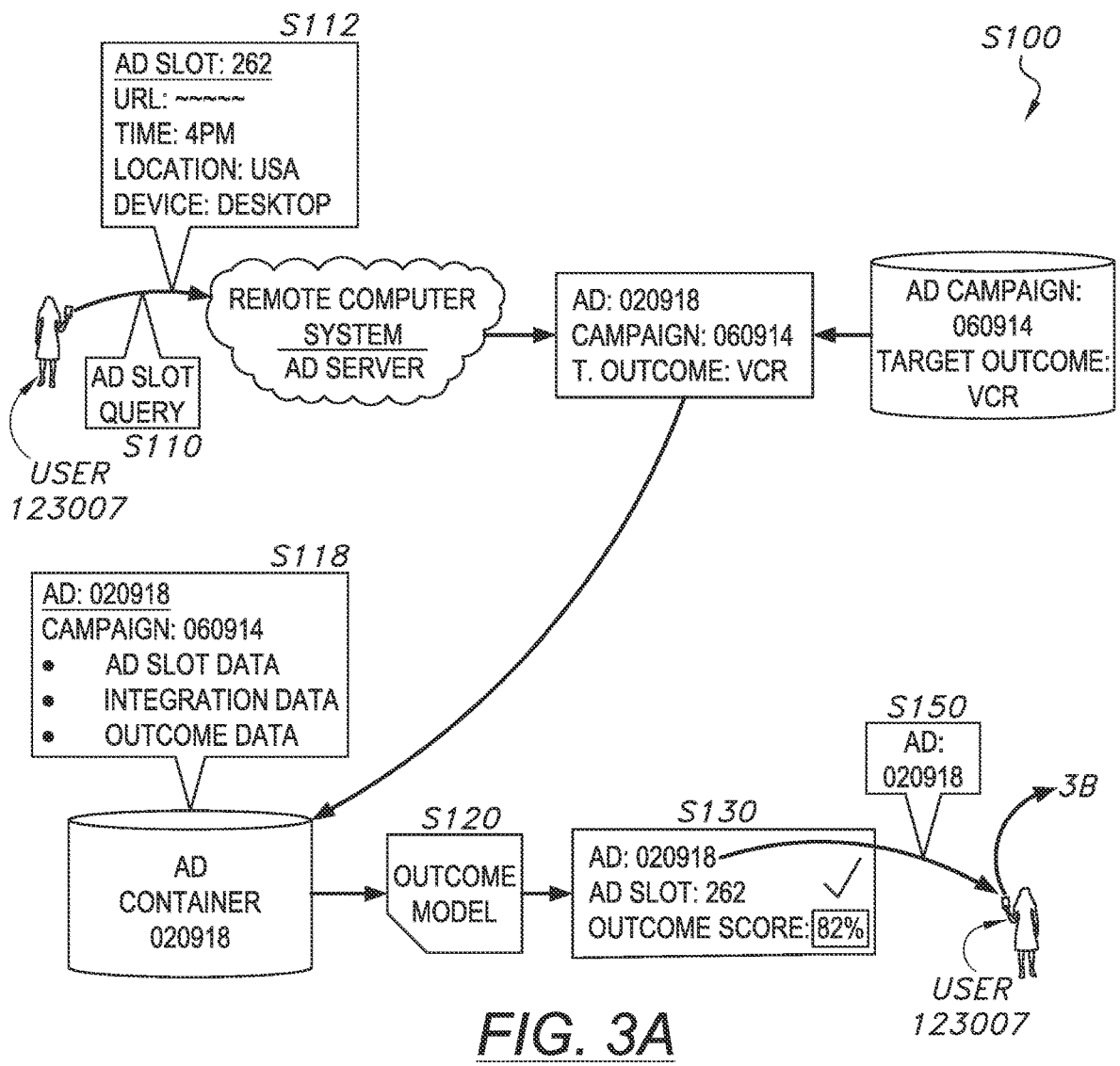
FIGS. 3A and 3B are flowchart representations of the method.
Figure 3B:
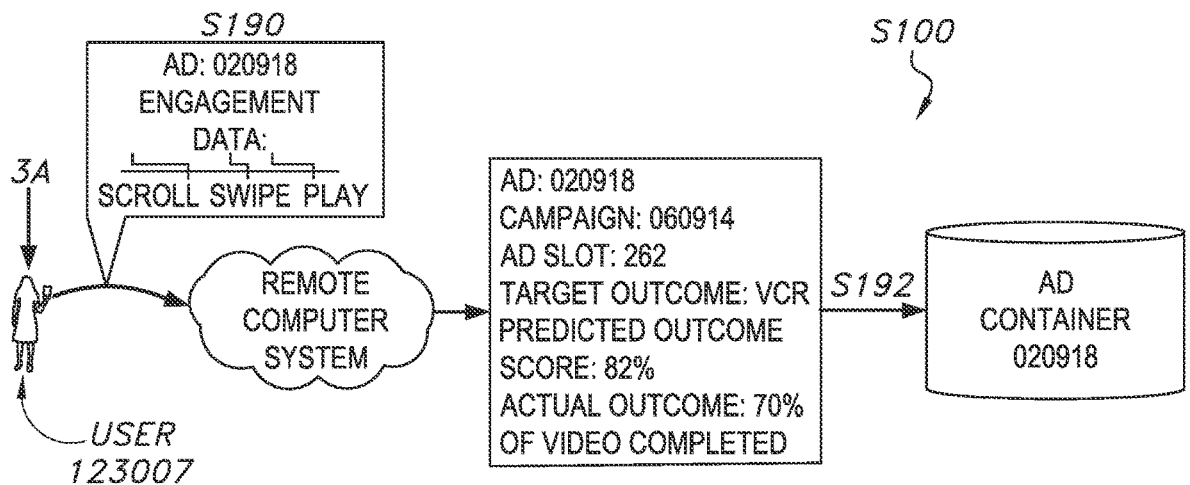

As shown in FIGS. 2, 3A, and 3B, one variation of the method S100 includes: a computer network, receiving identification of a first advertisement slot loaded within a first webpage accessed at a computing device associated with a user in Block S110; receiving a first set of advertisement slot characteristics comprising a first address of the first webpage and a first location of the first advertisement slot within the first webpage in Block S112; and accessing a model associating advertisement slot characteristics and user interactions with a set of advertisements in a first advertising campaign in Block S120. In this variation, the method S100 further includes, for a first advertisement, in the first advertising campaign: accessing a first set of advertisement characteristics stored in a first advertisement container corresponding to the first advertisement in Block S118; and calculating a first outcome score for the first advertisement based on the first set of advertisement slot characteristics, the first set of advertisement characteristics and the outcome model, the first outcome score representing a probability of the user interacting with the first advertisement, presented within the first advertisement slot, according to a first target outcome defined by the first advertising campaign in Block S130. The method S100 further includes, in response to the first outcome score exceeding a threshold outcome score, selecting the first advertisement for presentation within the first advertisement slot accessed by the computing device in Block S150.

As shown in FIGS. 2, 3A, and 3B, one variation of the method S100 includes: via a computer network, receiving identification of a first advertisement slot loaded within a first webpage accessed at a computing device associated with a user in Block S110; receiving a first set of advertisement slot characteristics including a first address of the first webpage and a location of the first advertisement slot within the first webpage in Block S112; accessing a model associating advertisement slot characteristics and user interactions with a set of advertisements in a first advertising campaign in Block S120; calculating a first outcome score for a first advertisement, in the first advertising campaign, based on the first set of advertisement slot characteristics and the outcome model, the first outcome score representing a probability of the user interacting with the first advertisement, presented within the first advertisement slot, according to a first target outcome defined by the first advertising campaign in Block S130; and, in response to the first outcome score exceeding a threshold outcome score, selecting the first advertisement for presentation within the first advertisement slot accessed by the computing device.

In this variation, the method S100 further includes: via the computer network, receiving identification of a second advertisement slot loaded within a second webpage accessed at a second computing device associated with a second user in Block S110; receiving a second set of advertisement slot characteristics including a second address of the second webpage and a second location of the second advertisement slot within the second webpage in Block S112; calculating a second outcome score for the first advertisement, in the first advertising campaign, based on the second set of advertisement slot characteristics and the outcome model, the second outcome score representing a probability of the user interacting with the second advertisement, presented within the second advertisement slot, according to the first target outcome in Block S130; and, in response to the second outcome score falling below the threshold outcome score, withholding the first advertisement for presentation within the second advertisement slot.

Figure 4:
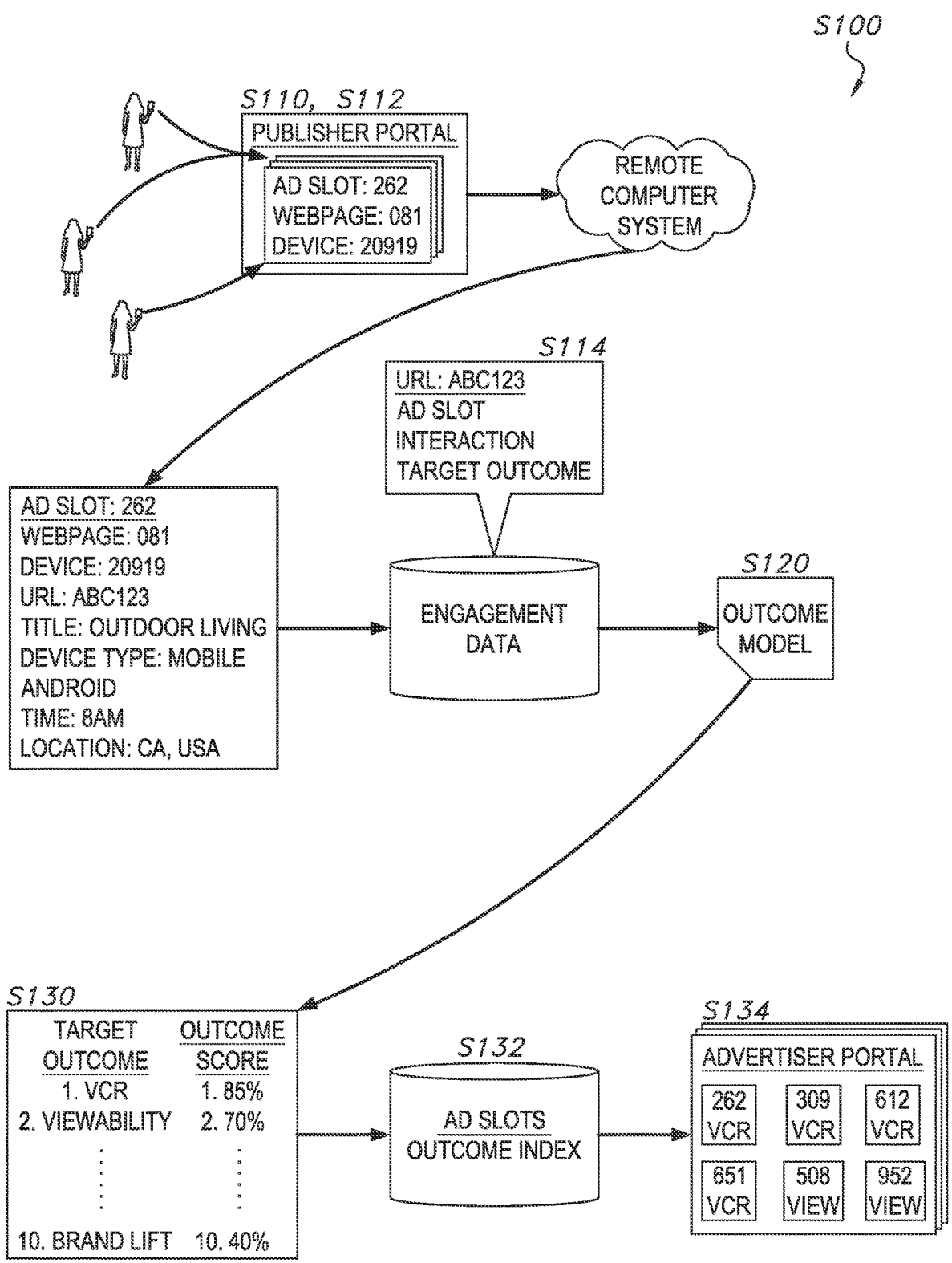
FIG. 4 is a flowchart representation of the method.

As shown in FIG. 4, one variation of the method S100 includes: via a computer network, receiving identification of a first advertisement slot loaded within a first webpage accessed at a computing device associated with a user; receiving a first set of advertisement slot characteristics comprising a first address of the first webpage and a first location of the first advertisement slot within the first webpage; and accessing a first set of engagement data associated with the first address of the first webpage, the first set of engagement data representative of user interactions with advertising content rendered within advertisement slots loaded within webpages accessed at the first address. The method further includes, for each target outcome, in a set of target outcomes: accessing an outcome model, in a set of outcome models, associating advertisement slot characteristics and user interactions with advertisements and corresponding to the target outcome; calculating an outcome score for the first advertisement slot based on the first set of advertisement slot characteristics, the first set of engagement data, and the outcome model, the outcome score representing a probability of the user interacting with advertising content, presented within the first advertisement slot, according to the target outcome; and inserting the target outcome into a first outcome index according to the outcome score. In this variation, the method further includes serving the first outcome index to an advertising platform, the first outcome index comprising a set of target outcome and outcome score pairs.

As shown in FIGS. 1 and 2, one variation of a method S100 for modeling digital advertisement consumption includes: receiving a query for advertising content from an advertisement slot located on a webpage accessed by a computing device interfacing with a user in Block S110; accessing a set of query characteristics from the computing device in Block S112, the set of query characteristics representative of advertisement slot characteristics (e.g., webpage and/or native application metadata, URL, advertisement size, advertisement format, location on webpage) and computing device characteristics (e.g., mobile or desktop, operating system, screen size, geographic location, time of day); accessing a model linking query characteristics with target outcomes of advertisements defined by an advertising campaign; predicting a first outcome score for a first target outcome in a set of target outcomes based on the model and the set of query characteristics in Block S130, the first outcome score representing a probability that the user will engage with advertising content loaded into the advertisement slot according to the first target outcome; in response to the first outcome score exceeding a threshold outcome score, selecting a first advertisement in the advertising campaign based on the first target outcome in Block S140, the first advertisement designating the first target outcome; and, serving the first advertisement, in the advertisement slot, to the computing device in Block S150.

As shown in FIG. 1, another variation of the method S100 includes: receiving a query for advertising content from an advertisement slot located on a webpage accessed by a computing device interfacing with a user in Block S110; accessing a set of query characteristics from the computing device in Block S112, the set of query characteristics representative of advertisement slot characteristics (e.g., webpage metadata, URL, location on webpage) and computing device characteristics (e.g., mobile, operating system, geographic location, time of day); accessing a model linking query characteristics with target outcomes of advertisements defined by an advertising campaign in Block S120; predicting a set of outcome scores for a set of target outcomes based on the model and the set of query characteristics in Block S130, each outcome score in the set of outcome scores corresponding to a probability that the user will engage with advertising content, in the advertisement slot, according to a particular target outcome in the set of target outcomes; in response to a first outcome score in the set of outcome scores exceeding each other outcome score in the set of outcome scores, assigning a first target outcome, corresponding to the first outcome score, to the advertisement slot in Block S140; selecting a first advertisement, in the advertising campaign, designating the first target outcome; and serving the first advertisement, in the advertisement slot, to the computing device in Block S150.

As shown in FIG. 1, one variation of the method S100 further includes, over a first period of time: serving advertising content in advertisement slots inserted into webpages rendered within web browsers executing on a set of computing devices interfacing with a population of users in Block S160; receiving a corpus of engagement data representing interactions of the population of users with advertising content in Block S170; and generating a model linking characteristics of advertisement slots (e.g., URL, webpage metadata, location of advertisement slot on webpage, time of day, geographic location of device, etc.) to target outcomes of advertising content (e.g., viewability, click-through, brand lift) based on the corpus of engagement data in Block S180.

2. Applications

Generally, Blocks of the method S100 can be executed by a remote computer system—such as a remote server functioning as or interfacing with an advertisement server—to: access local device data, received from a local device (e.g., a smartphone, a tablet, a desktop computer), that represents real-time characteristics of the device and/or characteristics of a user interfacing with the local device; leverage these local device data to predict types and degrees of user interactions with advertising content (e.g., advertisements, advertising campaigns, advertisement formats, etc.) inserted into an advertisement slot on a webpage or in a native application rendered on this local device; match this advertisement slot with advertising content based on these predicted user interactions, such as based on predicted alignment between a target interaction outcome designated by the advertising content and a predicted user interaction for this advertisement slot; and then serve this matched advertising content to this local device for insertion into this advertisement slot in near real-time. In particular, an advertiser may designate a particular target outcome for an advertisement or an advertisement campaign, such as video completion rate (or "VCR") or viewability. The remote computer system can then link achievement of this particular target outcome to a particular interaction type (e.g., scrolls, swipes, gestures, etc.) or to a particular combination of interaction types—performed by users when viewing this advertisement or advertisement in this advertisement campaign—that anticipate this particular target outcome. Over time, the remote computer system can: identify and/or learn advertisement slot characteristics (e.g., URL, webpage metadata, location of advertisement slot on webpage, time of day, device characteristics, user demographics) that anticipate these interaction types; and then implement Blocks of the method to selectively serve a particular advertisement to an advertisement slot within a webpage or native application view on a particular local device when characteristics of this local device and advertisement slot predict interaction types correlated with the particular target outcome specified by this particular advertisement. The remote computer system can similarly identify and/or learn characteristics of advertisements, advertising campaigns, advertisement formats, advertisement creatives, and/or any other advertising variables that anticipate these interaction types.

For example, the remote computer system can: receive a query for advertising content from an advertisement slot loaded onto a webpage viewed on a user's mobile device; predict interactions between the user and advertising content loaded in the advertisement slot based on characteristics of the query (e.g., device characteristics, user demographics, a URL, webpage metadata); and selectively serve advertising content—for insertion into this advertisement slot—to this mobile device based on alignment between these predicted interactions and the target output specified by this advertising content. In this example, to predict interactions between the user and this advertising content once loaded into the advertisement slot on the user's mobile device, the remote computer system can: access historical engagement data for a population of users viewing advertising content—on this webpage, on this website, or on media hosted by this publisher—just prior to the current time, around the current time of day, or on the current day of the week; further filter this historical engagement data by device location, advertisement slot location, and/or media tags for this webpage; and predict user interactions with advertising content loaded into this advertisement slot based on these filtered historical interactions, such as without uniquely identifying the user with cookies or accessing other unique user data.

The remote computer system can also generate and maintain an outcome model configured to intake advertisement slot characteristics and output predicted outcome scores representative of a predicted degree of interaction between a user and advertising content (e.g., representative of an extent to which the user "gave attention" to advertising content). The remote computer system can calculate outcome scores as a function of a set of attention metrics (e.g., degrees or duration of interactions of various interaction types), such as: a binary metric defining whether an advertisement entered a viewport of a computing device of a user; a view duration metric defining a duration of time an advertisement was visible in a viewport of a computing device; a scroll metric defining a number of times a user scrolled back and forth over an advertisement; a touch metric defining a number of times a user touched an advertisement; and/or a gesture metric defining a number of gestures performed by the user at her mobile device (e.g., to interact with interactive components of an advertisement); etc. For example, for a particular advertisement designating viewability as a target outcome, the remote computer system can: identify a set of interaction types—including a scroll metric and a view duration metric—that anticipate viewability of the particular advertisement; leverage the outcome model to predict durations and/or magnitudes of user interactions of these interaction types with the particular advertisement when loaded into a particular advertisement slot in a webpage viewed on the user's mobile device based on characteristics of the advertisement slot and the particular advertisement; and transform these predicted durations and/or magnitudes of user interactions into an outcome score (e.g., 70%, 70/100, 0.700) for the user and the particular advertisement. The remote computer system can repeat this process for (many) other advertisements queued for distribution, such as within 500 milliseconds of receipt of an advertisement query and advertisement slot characteristics from the user's mobile device. Based on these predicted outcome scores across this population of advertisements, the remote computer system can identity a particular advertisement with a greatest likelihood of achieving its target outcome when served to the user and then return a suggestion to a publisher of this webpage (or to an advertiser, an ad server) to serve this particular advertisement to this particular advertisement slot.

The remote computer system can therefore leverage these outcome scores to: increase probability that users will devote attention to advertising content and engage with advertising content in a manner that achieves a particular target outcome; improve an advertisement experience for users by serving users advertisements that users find appealing or interesting; optimize placement of advertising content by publishers to increase probability of achieving target outcomes specified by advertisements and advertising campaigns, in order to increase publisher revenue; and increase resources allocated by advertisers toward users who are more likely to engage with advertising content while decreasing resources allocated by advertisers towards users who are less likely to engage with advertising content. Thus, the remote computer system enables publishers and advertisers to identify the most valuable impressions (e.g., queries or advertisement slots) for particular advertisements or advertising campaigns and to allocate resources accordingly.

3. Example

The remote computer system can predict user interactions with advertising content based on characteristics of a query received in order to selectively serve advertisements to a user. For example, a user may access a first webpage on her mobile device, the first webpage corresponding to a first URL and including a first advertisement slot at a top of the webpage. Upon receiving a query for an advertisement from the first advertisement slot, the remote computer system can access data from the user's mobile device to obtain a set of advertisement slot characteristics, specific to the query from the first advertisement slot, such as: time, geographic location, type of device, URL/webpage metadata (e.g., a length of the webpage, types of media contained within the webpage, and/or type of the website hosting the website, such as a news or lifestyle website), position of the advertisement slot on the webpage, etc. The remote computer system can input this set of advertisement slot characteristics into an outcome model linking advertisement slot characteristics to user interactions with advertising content to predict whether the user is likely to achieve a particular target outcome (e.g., 80% video completion). The remote computer system can then estimate a first outcome score for this user interacting with advertising content in the first advertisement slot based on the outcome model and the set of advertisement slot characteristics, the first outcome score corresponding to a first target outcome (e.g., VCR). Additionally, the remote computer system can estimate a second outcome score corresponding to a second target outcome (e.g., viewability), and a third outcome score corresponding to a third target outcome (e.g., click-through), and so on. After calculating an outcome score for each target outcome (e.g., as specified by advertisements or advertising campaigns), the remote computer system can select a particular target outcome corresponding to the highest outcome score. In this example, if the first outcome score exceeds all other outcome scores (e.g., the second and third outcome scores), the remote computer system can select the first target outcome for the first advertisement slot, signifying the user is more likely to interact with advertising content in the first advertisement slot according to the first target outcome than interact with advertising content in the first advertisement slot according to the second or third target outcome. Upon selecting the first target outcome, the remote computer system can select a particular advertisement or advertising campaign designating the first target outcome (e.g., VCR) as the target outcome for the particular advertisement or advertising campaign. Thus, the remote computer system eliminates advertisements and/or advertising campaigns focused on target outcomes the user is unlikely to achieve, and narrows a selection of advertisements and/or advertising campaigns down to those designating target outcomes the user is more likely to achieve.

To select an advertisement from this narrowed list of advertisements available to the publisher, the remote computer system can implement a similar process to score the remaining advertisements and select a particular advertisement with the highest score. For a first advertisement, the remote computer system can access the outcome model, input the set of advertisement slot characteristics obtained from the mobile device of the user, as well as input a set of advertisement characteristics, specified by the first advertisement, such as: advertisement format (e.g., static or interactive with video, catalog, virtual reality, or hotspot content), type of brand advertised, type of product advertised, etc. The remote computer system can then estimate a first advertisement score for the user interacting with the first advertisement in the first advertisement slot, based on the outcome model, the set of advertisement slot characteristics, and the set of advertisement characteristics. The remote computer system can repeat this process to calculate an outcome score for each advertisement available for this first advertisement slot and designating the first target outcome. In this example, if the first advertisement score exceeds each other advertisement score, the remote computer system can select the first advertisement and serve the first advertisement, in the first advertisement slot on the first webpage, to the user.

Alternatively, the remote computer system can calculate a set of advertisement scores, each advertisement score in the set of advertisement scores corresponding to an advertisement, and weight each of these advertisement scores according to an impression value assigned to the advertisement. Thus, if the remote computer system calculates the first advertisement score as 85.0% and the first advertisement specifies a first impression value of $0.30, the remote computer system can calculate a first weighted advertisement score of 25.5%. For a second advertisement, the remote computer system can calculate a second advertisement score of 60%, based on the outcome model, the set of advertisement slot characteristics, and the set of advertisement characteristics. If the second advertisement specifies a second impression value of $0.60, the remote computer system can calculate a second weight advertisement score of 36.0%. The remote computer system can then select the second advertisement instead of the first advertisement, based on the first and second weighted advertisement scores, and serve the second advertisement in the first advertisement slot on the first webpage, to the user.

4. Outcome Model

The remote computer system can implement an outcome model configured to output a prediction of a user's propensity to engage (e.g., interact) with advertising content, loaded in a particular advertisement slot, according to a target outcome (e.g., defined by the advertising content). In particular, the remote computer system can access an outcome model configured to calculate an outcome score representative of a probability that a user will interact with advertising content, loaded in a particular advertisement slot, to achieve a particular target outcome based on characteristics of the particular advertisement slot (e.g., URL, webpage metadata, time, geographic location, placement of advertisement slot on webpage).

The remote computer system can leverage this outcome model to: predict attention metrics (e.g., number of scrolls, number of horizontal swipes, whether a user will click on an advertisement, number of gestures performed by a user while an advertisement is in a viewport of a computing device of the user, etc.) based on advertisement slot characteristics. For example, the remote computer system can implement the outcome model to calculate probabilities of achieving target outcomes (e.g., VCR, CTR, viewability) based on characteristics (i.e., advertisement slot characteristics) of queries for advertising content received.

For example, the remote computer system can store a "VCR" model configured to: intake advertisement metadata (e.g., advertising content, advertisement format, type of brand advertised, type of product advertised, etc.) given a particular video advertisement; and output an outcome score and/or probability that the user will view a minimum proportion of the particular video advertisement in the advertisement slot based on advertisement metadata and the set of advertisement slot characteristics. Similarly, the VCR model can also: intake a set of advertisement slot characteristics (e.g., time, geographic location, URL) for an advertisement slot located on a webpage accessed by a computing device of a user; and output a probability that the user will view a minimum proportion (e.g., 50%, 70%, 90%) of a video advertisement served in this advertisement slot based on this set of advertisement slot characteristics.

The remote computer system can similarly implement other outcome models, such as: a viewability model configured to output a probability that a minimum proportion of pixels of advertising content within the advertisement slot will be displayed in a viewport of the computing device of the user; a click-through model configured to output a probability that the user will click on advertising content in the advertisement slot; a click-through conversion model configured to output a probability that the user will click on advertising content and complete a purchase of a product advertised; etc. The remote computer system can also implement outcome models configured to predict probabilities of particular user interaction types, such as: a scroll model configured to output a probability that the user will scroll back and forth over advertising content at least a minimum number of times; a gesture model configured to output a probability that the user will perform a gesture (e.g., tilt) with her mobile device to interact with advertising content; a touch model configured to output a probability that the user will touch advertising content in a viewport of the user's mobile device a minimum number of times; etc.

Therefore, the remote computer system can leverage an outcome model: to predict attention metrics for a user interacting with advertising content in a particular advertisement slot—such as number of scrolls, number of horizontal swipes, whether a user will click on an advertisement, number of gestures performed by a user while an advertisement is in a viewport of a computing device of the user, etc.); and to calculate an outcome score for the user interacting with advertising content in this particular advertisement slot based on these attention metrics. Thus, the remote computer system can leverage the outcome model to predict types and/or magnitudes of user interactions with advertising content loaded into a particular advertisement slot defining a set of advertisement slot characteristics (e.g., URL, location of the advertisement slot within the webpage, webpage metadata, time of day, device characteristics) for this particular advertisement slot.

Further, the remote computer system can similarly leverage an outcome model to predict types and/or magnitudes of user interactions with advertising content loaded in a particular advertisement slot, defining a set of advertisement slot characteristics, given a particular advertising variable, such as: a particular advertisement, a particular advertising campaign, a particular advertisement format, a particular advertisement creative, and/or any combination of these advertising variables. For example, the remote computer system can implement an outcome model configured to intake: advertisement slot characteristics (e.g., URL, webpage metadata, location of advertisement slot within webpage, time of day, geographic location of computing device); webpage data or characteristics (e.g., webpage metadata, historical engagement data for advertising content loaded on a particular webpage); advertisement data or characteristics (e.g., advertisement metadata, format, historical engagement data for a particular advertisement); advertisement format data or characteristics (e.g., type of format, format metadata, historical engagement data for a particular advertisement format); and/or any combination of these data and/or characteristics. The remote computer system can then leverage the outcome model to output an outcome score or set of outcome scores (e.g., for a set of target outcomes) given these data and/or characteristics.

In one variation, the remote computer system can store a set of outcome models associated with different target outcomes. In particular, the remote computer system can: implement the foregoing methods and techniques to predict an outcome score for each target outcome by injecting a set of advertisement slot characteristics, received for a particular advertisement slot, into each of these outcome models; and then output an outcome score and/or probability that the user will achieve each target outcome when served advertising content in this advertisement slot. The remote computer system can also calculate outcome scores across these set of target outcomes for a particular advertisement by injecting a set of advertisement slot characteristics, received for a particular advertisement slot, and characteristics of a particular advertisement (e.g., advertisement metadata, subject, format, historical engagement data) into each of these outcome models; and then output an outcome score and/or probability that the user will achieve each target outcome when served this particular advertisement in this particular advertisement slot.

4.1 Single Outcome Model

Alternatively, the remote computer system can implement a single outcome model that outputs an outcome score representative of a user's predicted degree of engagement with advertising content in a particular advertisement slot on a webpage accessed by the user according to a set of attention metrics (e.g., scrolling back and forth over an advertisement at least a minimum number of times, clicking on an advertisement, swiping laterally through content with an advertisement, viewing at least a minimum duration of a video with an advertisement, converting through an advertisement, exhibiting at least a threshold increase in brand recognition after an advertisement is served to the user, etc.).

4.2 Outcome Scores

In one implementation, the remote computer system can calculate outcome scores for a particular target outcome, representing a degree of user engagement with advertising content at a particular advertisement slot according to a particular outcome. For example, the remote computer system can calculate a VCR score representing a user's propensity to watch video advertising content at a particular advertisement slot defining a set of advertisement slot characteristics (e.g., URL, webpage metadata, advertisement slot location on webpage, time of day, geographic location of device). In another example, the remote computer system can calculate a viewability score representing a user's propensity to view at least a minimum proportion of advertising content in an advertisement slot for at least a minimum duration. In yet another example, the remote computer system can calculate a scroll score representing a user's propensity to scroll back and forth over advertising content in an advertisement slot at least a minimum number of times.

In one variation, the remote computer system can calculate outcome scores (e.g., viewability score) as a function of attention metrics (e.g., number of scrolls, duration a minimum proportion of pixels of advertising content was visible in a viewport of a computing device of a user; number of interactions between the user and advertising content). In this variation, the remote computer system can input advertisement slot characteristics into the outcome model to: predict a set of attention metrics given these advertisement slot characteristics; and calculate a set of outcome scores as a function of these attention metrics (e.g., a single attention metric, a combination of attention metrics, all attention metrics), each outcome score corresponding to a particular target outcome.

In one variation, the remote computer system can calculate a set of outcome scores given a particular advertisement. For example, in response to receiving a query for advertising content in a first advertisement slot, the remote computer system can: access a set of advertisement slot characteristics for the first advertisement slot associated with the query; access a set of advertisement metadata for the first advertisement; access an outcome model linking advertisement slot characteristics and advertisement metadata to a set of target outcomes; and calculate a set of outcome scores for the first advertisement at the first advertisement slot, each outcome score corresponding to a particular target outcome and representative of a user's propensity to engage with the first advertisement in the first advertisement slot according to the particular target outcome. Additionally and/or alternatively, the remote computer system can calculate a composite outcome score representative of the user's propensity to engage with the first advertisement in the first advertisement slot according to all target outcomes.

The remote computer system can similarly calculate outcome scores for other advertising variables, such as: advertising campaigns; advertisement formats; advertisement creative; etc. Additionally, the remote computer system can calculate outcome scores for any combination of these advertising variables.

In one variation, the remote computer system can leverage advertisement slot characteristics (e.g., time of day, location of advertisement slot on the webpage, webpage characteristics, device characteristics) to calculate outcome scores for a particular advertisement format, representing a degree of user engagement with advertising content in the particular advertisement format loaded at a particular advertisement slot. The remote computer system can then identify a particular advertisement format best matched to a particular advertisement slot. For example, in response to receiving identification of a first advertisement slot loaded within a first webpage, the remote computer system can: extract a set of advertisement slot characteristics associated with the first advertisement slot; access an outcome model associating advertisement slot characteristics and user interactions with advertising content rendered within advertisement slots; and calculate a first set of outcome scores for a particular advertisement format (e.g., static, video, interactive, banner), each outcome score corresponding to a target outcome and representative of a user's propensity to engage with the advertising content of the particular advertisement format, presented within the first advertisement slot, according to the target outcome. More specifically, in this example, the remote computer system can: calculate a first outcome score for a first advertisement format responsive to scroll inputs by the user, the first outcome score corresponding to a first target outcome (e.g., viewability); and calculate a second outcome score for the first advertisement format, the second outcome score corresponding to a second target outcome (e.g., conversion). In response to the first outcome score exceeding the second outcome score, the remote computer system can assign the first target outcome to the first advertisement slot for advertisements of the first advertisement format. In this example, the remote computer system can then select an advertisement, of the first advertisement format, in an advertising campaign specifying the first target outcome, for presentation within the first advertisement slot.

Additionally, in the preceding example, the remote computer system can calculate a second set of outcome scores associated with a second advertisement format defining a set of selectable regions. The remote computer system can then select a particular advertisement format (e.g., the first or the second advertisement format) most likely to achieve each target outcome, in the set of target outcomes. For example, the remote computer system can: select the first advertisement format responsive to scroll inputs for advertisements specifying a target outcome of viewability; and select the second advertisement format defining the set of selectable regions for advertisements specifying a target outcome of conversion.

In another example, the remote computer system can calculate a composite outcome score for a particular advertisement format. In particular, in response to receiving identification of a first advertisement slot loaded within a first webpage, the remote computer system can: extract a set of advertisement slot characteristics associated with the first advertisement slot; access the outcome model associating advertisement slot characteristics and user interactions with advertising content rendered within advertisement slots; and calculate a first set of outcome scores for the particular advertisement format. The remote computer system can then calculate a composite outcome score for the particular advertisement format based on each outcome score, in the first set of outcome scores. Then, in response to the composite outcome score exceeding a threshold outcome score, the remote computer system can select the first advertisement format for advertising content presented within the first advertisement slot. The remote computer system can repeat this process for each advertisement format, in a set of advertisement formats, to calculate a set of composite outcome scores. The remote computer system can therefore: identify a subset of composite outcome scores, in the set of composite outcome scores, exceeding the threshold outcome score; and select a subset of advertisement formats, in the set of advertisement formats, and corresponding to the subset of composite outcome scores, for advertising content presented within the first advertisement slot. Alternatively, the remote computer system can: rank the set of composite outcome scores to identify a particular composite outcome score exceeding each other composite outcome score, in the set of composite outcome scores; and select a particular advertisement format corresponding to the particular composite outcome score for advertising content presented within the first advertisement slot.

4.3 Training the Outcome Model

In one variation, the remote computer system automatically develops (or "learns") an outcome model for a particular target outcome based on advertisement characteristics, engagement data, and outcomes recorded at advertisement slots containing advertising content served to a subset of users in a user population during a training period.

For example, during a training period, the remote computer system can: serve advertising content to advertisement slots loaded on webpages accessed by computing devices of users in a subset of users in a user population; access advertisement slot characteristics (e.g., URL, website and/or native application, time of day, geographic location, device, advertisement metadata) for each advertisement slot; record attention metrics (or user interactions) (e.g., number of scrolls back on forth over an advertisement, duration a minimum proportion of an advertisement was visible in a viewport of the computing device, location of an advertisement within a viewport of the computing device, number of horizontal swipes across an advertisement) with advertising content contained in these advertisement slots; access a set of outcomes associated with these user interactions (e.g., conversion, click-through, brand lift, viewability, VCR); deduce a particular user interaction type or combination of user interaction types that anticipates a particular outcome; and, deduce advertisement slot characteristics (or "query characteristics") that anticipate these particular user interaction types or combinations of user interaction types. Given this data, the remote computer system can calculate and assign outcome scores to each advertisement slot served advertising content during the training period.

Later, during a live period succeeding the training period, in response to receiving a query for an advertisement from a particular advertisement slot (e.g., located within a native application accessed by a computing device associated with a user), the remote computer system can: access a set of advertisement slot characteristics (e.g., URL, native application metadata, time, geographic location of device) for the particular advertisement slot; access the outcome model linking advertisement slot characteristics to target outcomes of advertising campaigns; input this set of advertisement slot characteristics into the outcome model to estimate a set of attention metrics (e.g., number of scrolls, percentage of advertisement pixels visible in a viewport of the computing device, duration of time a minimum number of pixels are visible in the viewport, etc.) representing predicted interactions between this user and advertising content at this particular advertisement slot; and, given a particular target outcome, output an outcome score for this particular target outcome for the user interacting with advertising content in the particular advertisement slot, based on the advertisement slot characteristics and these predicted interactions. Therefore, the remote computer system can leverage attention metrics and advertisement slot characteristics recorded during the training period, to generate a model configured to predict attention metrics given advertisement slot characteristics during the live period (e.g., based on similarities and/or dissimilarities of advertisement slot characteristics). The remote computer system can then calculate outcome scores based on these predicted attention metrics to intelligently identify and/or serve advertisements to users that these users are more likely to engage with according to these attention metrics.

The remote computer system can implement similar methods and techniques to develop an outcome model for a particular advertisement, for a particular advertising campaign, for a particular advertisement format, for a particular webpage (e.g., URL), for a particular advertisement slot on a webpage, for a particular advertisement slot location on a webpage, for particular advertising content, etc. Similarly, the remote computer system can then leverage this outcome model to intelligently identify, suggest, and/or select advertisements, advertising campaigns, advertisement slots, etc. most likely to achieve a high degree of user engagement according to a particular target outcome (e.g., VCR, viewability, click-through). Alternatively, the remote computer system can implement a generic outcome model to predict user interactions with advertising content loaded in a particular advertisement slot, such as regardless of the advertisement, advertisement format, advertising campaign, etc.

In one implementation, the remote computer system can generate an advertisement-specific outcome model configured to intake a set of advertisement slot characteristics and to output an outcome score for a user interacting with a particular advertisement loaded in a particular advertisement slot. For example, during a training period for a first advertisement (e.g., prior to a live period for the first advertisement), the remote computer system can: serve the first advertisement to advertisement slots loaded on webpages accessed by computing devices of users in a subset of users in a user population; access a corpus of advertisement slot characteristics (e.g., URL, website and/or native application, time of day, geographic location, device, advertisement metadata) for each advertisement slot loaded with the first advertisement; and access a corpus of engagement data, corresponding to the first advertisement loaded within these advertisement slots, including attention metrics (or user interactions) (e.g., number of scrolls back on forth over an advertisement, duration a minimum proportion of an advertisement was visible in a viewport of the computing device, location of an advertisement within a viewport of the computing device, number of horizontal swipes across an advertisement) and/or outcomes associated with these user interactions (e.g., conversion, click-through, brand lift, viewability, VCR). The remote computer system can then implement statistical analysis, regression, and/or artificial intelligence, etc. to: derive typical advertisement slot characteristics that anticipate a target outcome (e.g., minimum viewability, minimum VCR) and/or target set of interactions (e.g., minimum number of scrolls, minimum number of clicks) defined by the first advertisement; and compile these advertisement slot characteristics into an advertisement-specific outcome model for the first advertisement.

Alternatively, in another implementation, the remote computer system can leverage a generic outcome model to initially select and serve advertisements for presentation within advertisement slots and customize this outcome model over time. For example, the remote computer system can initially leverage a generic outcome model to select a first advertisement for presentation within a first advertisement slot, based on a first set of advertisement slot characteristics corresponding to the first advertisement slot. The remote computer system can then access a set of engagement data, for a user interacting with the first advertisement in the first advertisement slot, including attention metrics (or user interactions) and/or outcomes associated with these user interactions. The remote computer system can then leverage these engagement data and advertisement slot characteristics to modify the generic outcome model. By repeating this process for each instance of the first advertisement served to an advertisement slot, the remote computer system can modify, mask, or customize the generic outcome model for the first advertisement.

The remote computer system can similarly implement these methods and techniques, described above, to generate an outcome model for a particular advertising campaign, a particular webpage, a particular advertisement format, or for any other advertising variable.

In one variation (as described in U.S. patent application Ser. No. 16/119,819), the remote computer system can define a threshold outcome score (e.g., minimum video completion rate, minimum viewability, minimum number of scrolls, minimum number of clicks) that indicates at least a minimum engagement with advertising content (e.g., a minimum probability of a target outcome). For example, during a test period, the remote computer system can serve advertising content, loaded in advertisement slots, to a population of computing devices accessed by a population of users. For each advertisement slot served to the population of computing devices, the remote computer system can record: a set of advertisement slot characteristics (e.g., URL, webpage data, time of day, type of user device, location of advertisement slot within webpage); and a set of engagement data (i.e., attention metrics) (e.g., clicks, scrolls, swipes, tilts, view duration, percent video completion, cumulative pixel exposure) representing user interactions with advertising content. The remote computer system can then: access outcomes—of a particular outcome type (e.g., brand lift, conversion, VCR, viewability)—of consumption of advertising content presented within advertisement slots to the population of computing devices during the test period; calculate a correlation (e.g., covariance) between engagement data and outcome of the particular outcome type based on engagement data and outcomes associated with each set of engagement data; and define a type and/or magnitude of user interactions associated with a threshold probability of an outcome of the particular outcome type based on this correlation. More specifically, in this example, the remote computer system can implement machine learning, artificial intelligence, a neural network, or other analysis techniques to calculate a probability of an outcome of the particular type as a function of engagement data (i.e., attention metrics) based on recorded engagement and outcome data for the population of users. Based on a target probability of a target outcome occurring as a result of viewing advertising content (e.g., 50% probability of the target outcome)—such as specified for by an advertising campaign, by an ad publisher or advertiser—the remote computer system can estimate a target set of interactions (i.e., attention metrics) (e.g., magnitude and/or type) predicted to yield this target probability of the target outcome. Further, the remote computer system can implement the methods described above to generate a model linking advertisement slot characteristics of advertisement slots accessed by the population of computing device to user interactions with advertising content loaded in these advertisement slots and/or to outcomes associated with these user interactions.

5. Publisher Tool

In one implementation, the remote computer system can execute Blocks of the method S100 to assist publishers (e.g., advertisement publishers) in selecting advertising content (e.g., advertisements, advertising campaigns, advertisement formats, etc.) to serve to users at particular advertisement slots on webpages accessed by these users in order to achieve high user engagement according to particular target outcomes and thus increase revenue. However, the remote computer system can similarly execute Blocks of the method S100 to assist an advertiser, an advertising campaign, or any other advertising entity in targeting advertising content toward impressions that are more likely to achieve a particular target outcome.

For example, a publisher may currently have an inventory of 100 active advertising campaigns, each advertising campaign defining ten unique advertisements. In response to receiving a query for an advertisement from a particular advertisement slot, the remote computer system can implement Blocks of the method S100 to select a single advertising campaign out of the 100 active advertising campaigns most likely to achieve high user engagement according to a target outcome specified by the advertising campaign, and to select a single advertisement from the advertising campaign most likely to achieve high user engagement according to this target outcome.

In this implementation, the remote computer system can leverage advertisement slot characteristics to identify a particular target outcome (e.g., VCR, viewability, brand lift) that a user interacting with advertising content in a particular advertisement slot is most likely to achieve. For example, in response to receiving identification of a first advertisement slot loaded within a first webpage accessed by a computing device associated with a user, the remote computer system can: receive a first set of advertisement slot characteristics (e.g., URL, location of the advertisement slot within the webpage, dimensions of the advertisement slot, time of day accessed by the computing device, geographic location of the computing device, type of computing device); access a catalog of advertisements assigned to a set of webpages including the first webpage, each advertisement in the catalog of advertisements defining a target outcome representative of a set of target interactions for users interacting with the advertisement; and access a model associating advertisement slot characteristics and a set of target outcomes of advertisements in the catalog of advertisements.

Then, for each target outcome, in the set of target outcomes, the remote computer system can: estimate an outcome score for the first advertisement slot based on the first set of advertisement slot characteristics and the outcome model, the outcome score representative of a probability of the user interacting with advertising content, presented within the first advertisement slot, according to the target outcome. In particular, in this example, the remote computer system can: estimate a first outcome score corresponding to VCR; estimate a second outcome score corresponding to viewability; and estimate a third outcome score corresponding to brand lift. The remote computer system can store the first, second, and third outcome scores in a first set of outcome scores associated with the first advertisement slot.

Then, in response to the first target outcome, in the first set of outcome scores, exceeding the second and third outcome scores, the remote computer system can assign the first target outcome of VCR to the first advertisement slot. The remote computer system can then identify an advertisement and/or advertising campaign designating VCR as the target outcome for this advertisement and/or advertising campaign.

In one variation, the remote computer system can leverage webpage data (e.g., owned by the publisher) to predict outcome scores for advertisement slots. For example, in response to receiving identification of a first advertisement slot loaded within a first webpage accessed at a computing device (e.g., mobile computing device), the remote computer system can: receive a first set of advertisement slot characteristics including a first address associated with the first webpage; and access a first set of webpage data, stored in a webpage container, corresponding to the first webpage based on the first address, the first set of webpage data including webpage metadata (e.g., title, description, related concepts) and/or historical engagement data (e.g., historical advertisement slot characteristics, historical outcome) associated with advertisements rendered within the first webpage. The remote computer system can then: access a catalog of advertisements assigned to the first webpage; access a model associating advertisement slot characteristics and webpage data to a set of target outcomes of advertisements in the catalog of advertisements; and, for each target outcome in the set of target outcomes, estimate an outcome score for the first advertisement slot based on the first set of advertisement slot characteristics, the first set of webpage data, and the outcome model. Therefore, in this example, the remote computer system can leverage webpage data stored for the first webpage, to modify the outcome model to more accurately predict outcome scores for the first advertisement slot loaded on this particular webpage.

In the preceding example, the remote computer system can update the webpage data stored for the first webpage based on the first set of advertisement slot characteristics and outcomes associated with presenting advertising content in the first advertisement slot. For example, in response to serving a first advertisement in the first advertisement slot for presentation to the user within the first webpage, the remote computer system can: receive a first set of engagement data (e.g., quantity of clicks, quantity of scrolls, duration of view, proportion of advertisement visible within a display of the computing device); and, for each target outcome in the set of target outcomes, calculate an actual outcome score for the first advertisement slot based on the first set of engagement data. In particular, for a target outcome of viewability, the remote computer system can calculate an actual viewability score for advertising content presented within the first advertisement slot based on a proportion of an advertisement visible within a display of the computing device and a duration of time the proportion of the advertisement was visible within the display. The remote computer system can similarly calculate actual outcome scores for each additional target outcome, in the set of target outcomes. The remote computer system can then: compile the first set of advertisement slot characteristics, the first set of outcome scores (e.g., initially predicted outcome scores), and the first set of actual outcome scores into a first advertisement slot container representative of the first advertisement slot; and insert the first advertisement slot container into the webpage container associated with the first webpage.

The remote computer system can similarly modify or mask the outcome model based on recorded advertisement slot characteristics and engagement data (e.g., interaction data, outcome data) stored for a particular webpage, a particular advertisement, a particular advertising campaign, and/or a particular advertisement format.

In one variation, the remote computer system can calculate an outcome score given a particular target outcome, based on characteristics of a query received from a particular advertisement slot. For example, the remote computer system can: receive a query for an advertisement from a computing device associated with a user; access an outcome model linking advertisement slot characteristics to target outcomes of advertising campaigns; calculate a first outcome score for a first target outcome based on the outcome model and characteristics of the query; and, in response to the first outcome score exceeding a threshold outcome score, select a first advertisement designating the first target outcome as its target outcome. Alternatively, in response to the first outcome score falling below the threshold outcome score, the remote computer system can: calculate a second outcome score for a second target outcome; and in response to the second target outcome exceeding the threshold outcome score select a second advertisement designating the second target outcome as its target outcome. The remote computer system can iterate this process to find a particular target outcome with a high outcome score for this query from this particular advertisement slot, and therefore match this advertisement slot with an advertisement that the user is likely to engage with according to the target outcome specified by the advertisement.

In another variation, the remote computer system can calculate an outcome score given a particular advertisement. In this variation, the remote computer system can input data from a user's device (e.g., advertisement slot characteristics) and/or advertisement metadata (e.g., content, format, brand, product) for the particular advertisement into the outcome model. For example, given a particular target outcome, the remote computer system can select a particular advertisement designating this particular target outcome that is most likely to yield a high degree of user engagement and achieve the target outcome. In this example, the remote computer system can implement the outcome model to: calculate a first outcome score for a first advertisement designating the particular target outcome based on advertisement slot characteristics and advertisement metadata of the first advertisement; calculate a second outcome score for a second advertisement designating the particular target outcome based on advertisement slot characteristics and advertisement metadata of the second advertisement; and calculate a third outcome score for a third advertisement designating the particular target outcome based on advertisement slot characteristics and advertisement metadata of the third advertisement. Given these three outcome scores, the remote computer system can select the advertisement corresponding to the greatest outcome score.

Alternatively, the remote computer system can calculate weighted outcome scores, based on bidding values provided by advertisers for particular impressions (or e.g., queries). Alternatively, the remote computer system can calculate a set of advertisement scores, each advertisement score in the set of advertisement scores corresponding to an advertisement, and weight each of these advertisement scores according to an impression value assigned to the advertisement. Thus, if the remote computer system calculates the first advertisement score as 85.0% and the first advertisement specifies a first impression value of $0.30, the remote computer system can calculate a first weighted advertisement score of 25.5%. For a second advertisement, the remote computer system can calculate a second advertisement score of 60%, based on the outcome model, the set of advertisement slot characteristics, and the set of advertisement characteristics. If the second advertisement specifies a second impression value of $0.60, the remote computer system can calculate a second weight advertisement score of 36.0%. The remote computer system can then select the second advertisement instead of the first advertisement, based on the first and second weighted advertisement scores, and serve the second advertisement in the first advertisement slot on the first webpage, to the user.

In one variation, a publisher can—in combination with the remote computer system—implement the outcome model to predict a single outcome score for each query received (e.g., a viewability score, a VCR score, a composite outcome score representative of all interaction types) and rank each query received according to its corresponding outcome score. The remote computer system can then match each query to an advertisement according to an impression value assigned to each advertisement available to the publisher by the publisher and/or by the advertiser.

In one implementation, the remote computer system can implement the outcome model to predict outcome scores for multiple advertisement slots loaded into a single webpage or across multiple webpages. For example, at a first time, in response to receiving identification (e.g., via a computer network) of a first advertisement slot loaded within a first webpage accessed at a computing device associated with a user, the remote computer system can: receive a first set of advertisement slot characteristics including an address (e.g., URL) of the first webpage, a location (e.g., vertical and/or lateral position) of the first advertisement slot within the first webpage, and/or a size (e.g., dimensions) of the first advertisement slot; and access a set of webpage data (e.g., webpage metadata, historical engagement data associated with the first webpage) corresponding to the first webpage (e.g., stored in a webpage container). The remote computer system can then calculate a first set of outcome scores for the first advertisement slot based on the first set of advertisement slot characteristics, the set of webpage data, and the outcome model, each outcome score corresponding to a particular target outcome, in a set of target outcomes of advertisements in advertising campaigns assigned to this webpage (e.g., contracted with the publisher). Additionally, in response to receiving identification (e.g., via a computer network) of a second advertisement slot loaded within the first webpage accessed at the computing device, the second advertisement slot below the first advertisement slot within the first webpage, the remote computer system can receive a second set of advertisement slot characteristics including the address (e.g., URL), a location (e.g., vertical and/or lateral position) of the second advertisement slot within the second webpage, and/or a size (e.g., dimensions) of the second advertisement slot. The remote computer system can then calculate a second set of outcome scores for the second advertisement slot based on the second set of advertisement slot characteristics, the set of webpage data, and the outcome model, each outcome score corresponding to a particular target outcome, in the set of target outcomes. The remote computer system can identify a particular target outcome that the user is most likely to achieve for each advertisement slot loaded within this first webpage. In particular, in this example, the remote computer system can: identify a first outcome score, in the first set of outcome scores, corresponding a first target outcome of VCR, exceeding each other outcome score in the first set of outcome scores; and identify a second outcome score, in the second set of outcome scores, corresponding to a second target outcome of viewability, exceeding each other outcome score in the second set of outcome scores. Then, the remote computer system can: access a set of advertising campaigns available to the publisher for advertisement slots on the first webpage; identify a first advertising campaign specifying the first target outcome of VCR for advertisements in the first advertising campaign; select a first advertisement from the first advertising campaign for presentation within the first advertisement slot; identify a second advertising campaign specifying the second target outcome of viewability for advertisements in the second advertising campaign; and select a second advertisement from the second advertising campaign for presentation within the second advertisement slot.

In another example, the remote computer system can leverage outcome scores of each advertisement slot (e.g., loaded within a single webpage) to identify best combinations of advertisements and advertisement slots. In particular, in the preceding example, for the first advertisement slot, the remote computer system can predict: a first outcome score of 90% for the first target outcome of VCR; and a second outcome score of 70% for viewability. Then, for the second advertisement slot, the remote computer system can predict: a third outcome score of 80% for the first target outcome of VCR; and a fourth outcome score of 60% for the second outcome score of viewability. The remote computer system can then access a catalog of advertisements assigned to the first webpage to select an advertisement for presentation within each slot. In this example, in response to the catalog including a first advertisement designating VCR as the target outcome and a second advertisement designating viewability as the target outcome, the remote computer system can: predict a first combination outcome score corresponding to the first advertisement, presented within the first advertisement slot, and the second advertisement, presented within the second advertisement slot, based on a combination (e.g., product, sum, average) of the first outcome score and the fourth outcome score; and predict a second combination outcome score corresponding to the second advertisement, presented within the first advertisement slot, and the first advertisement, presented within the second advertisement slot, based on a combination (e.g., product, sum, average) of the second outcome score and the third outcome score. In particular, in this example, the remote computer system can: calculate a first product of the first outcome score of 90% (e.g., for the first target outcome of VCR) and the fourth outcome score of 60% (e.g., for the second target outcome of viewability) to predict a first combination outcome score of 54%; and calculate a second product of the second outcome score of 70% (e.g., for the second target outcome of viewability) and the third outcome score of 80% (e.g., for the first outcome score of VCR) to predict a second combination outcome score of 56%. Then, in response to the second combination outcome score exceeding the first combination outcome score, the remote computer system can: assign the second advertisement, designating the second target outcome of viewability, to the first advertisement slot; and assign the first advertisement, designating the first target outcome of VCR, to the second advertisement slot. Therefore, a publisher—in combination with the remote computer system—can leverage these combination outcome scores to enable load balancing of available advertisements and/or advertising campaigns, while maximizing overall likelihood of achieving target outcomes of these advertisements and/or advertising campaigns.

6. Advertiser Tool

In one implementation, the remote computer system can execute Blocks of the method S100 to assist an advertiser in targeting advertising content toward impressions (e.g., queries or advertisement slots) that are more likely to achieve a particular target outcome as specified by advertisements or advertising campaigns associated with the advertiser. However, the remote computer system can similarly execute Blocks of the method S100 to assist a publisher, an advertising campaign, or any other advertising entity in targeting advertising content toward impressions that are more likely to achieve a particular target outcome.

In one variation, the remote computer system can calculate a value of an impression given a particular target outcome assigned by the advertiser. For example, during an advertisement auction, an advertiser may bid on a particular advertisement slot located on a webpage accessed by a computing device (e.g., desktop computer) of a user. If the advertiser wins the advertisement auction, the remote computer system can—on behalf of the advertiser—implement the outcome model to select a particular advertisement for placement in the advertisement slot that is most likely to yield the user's attention and a high level of engagement according to a target outcome defined by the particular advertisement.

In one implementation, the remote computer system can leverage stored advertisement characteristics (e.g., advertisement metadata, format, subject, historical engagement data) to identify a particular advertisement, in an advertising campaign, for presentation within a particular advertisement slot. In particular, the remote computer system can calculate an outcome score for advertisements in an advertising campaign to inform selection of an advertisement for presentation within a particular advertisement slot.

For example, at a first time, an advertising campaign may define a minimum video completion rate as a target outcome for a set of advertisements, in the advertising campaign (e.g., via an instance of a advertiser portal). Later, in response to receiving identification of a first advertisement slot loaded within a first webpage accessed at a computing device associated with a user, the remote computer system can: receive a first set of advertisement slot characteristics (e.g., a first address of the first webpage, a first location of the first advertisement slot within the first webpage, a time of day at which the first advertisement slot was loaded into the first webpage, a type of device accessing the first advertisement slot) corresponding to the first advertisement slot; and access a model associating advertisement slot characteristics and user interactions with the set of advertisements in the first advertising campaign. Then, for a first advertisement, in the first advertising campaign, the remote computer system can: access a first set of advertisement characteristics stored in a first advertisement container corresponding to the first advertisement; and predict a first outcome score for the first advertisement based on the first set of advertisement slot characteristics, the first set of advertisement characteristics and the outcome model, the first outcome score representing a probability of the user interacting with the first advertisement, presented within the first advertisement slot, according to the minimum video completion rate defined by the advertising campaign. Then, in response to the first outcome score for the first advertisement exceeding a threshold outcome score, the remote computer system can select (e.g., flag) the first advertisement for presentation within the first advertisement slot accessed by the computing device.

However, in the preceding example, in response to the first outcome score falling below the threshold outcome score, the remote computer system can: withhold the first advertisement from presentation within the first advertisement slot; and select a second advertisement, in the advertising campaign, for presentation within the first advertisement slot. In particular, the remote computer system can: access a second set of advertisement characteristics stored in a second advertisement container corresponding to the second advertisement; and predict a second outcome score for the second advertisement, based on the second set of advertisement slot characteristics, the second set of advertisement characteristics and the outcome model, the second outcome score representing a probability of the user interacting with the second advertisement, presented within the first advertisement slot, according to the minimum video completion rate defined by the first advertising campaign. In response to the second outcome score exceeding the threshold outcome score, the remote computer system can select (e.g., flag) the second advertisement for presentation within the first advertisement slot. However, if the second outcome falls below the threshold outcome score, then the remote computer system can reiterate this process for subsequent advertisements, in the advertising campaign, until identifying an advertisement predicted to achieve the minimum video completion rate.

Additionally and/or alternatively, for each advertisement in the advertising campaign, the remote computer system can: access a set of advertisement characteristics stored in an advertisement container corresponding to the advertisement; and predict an outcome score for the advertisement, based on the set of advertisement slot characteristics, the set of advertisement characteristics and the outcome model, the outcome score representing a probability of the user interacting with the advertisement, presented within the first advertisement slot, according to the minimum video completion rate defined by the first advertising campaign. The remote computer system can then: rank each advertisement, in the advertising campaign, according to target outcome; and select a particular advertisement, in the advertising campaign, corresponding to the highest target outcome. In particular, in the preceding example, the remote computer system can predict the first outcome score for the first advertisement and the second outcome score for the second advertisement as described. Then, in response to the first outcome score exceeding the second outcome score, the remote computer system can select the first advertisement for presenting within the first advertisement slot. Alternatively, in response to the second outcome score exceeding the first outcome score, the remote computer system can select the second advertisement for presenting within the first advertisement slot.

In one variation, the remote computer system can estimate a value of an impression to the advertiser, and suggest this value to the advertiser for bidding during an advertisement auction. For example, for a particular impression corresponding to an advertisement slot on a webpage accessed by a mobile device of a user, the remote computer system can implement the outcome model to calculate an outcome score of 95% for VCR. Based on this outcome score, the remote computer system can calculate a value of this impression for a particular advertising campaign of this advertiser and/or for a particular advertisement. In this example, if a first advertising campaign of the advertiser includes all video advertisements, the remote computer system can calculate a high value for this impression for the first advertising campaign of this advertiser. The advertiser can then bid in the advertisement auction based on the value provided by the remote computer system. Alternatively, the remote computer system can automatically bid this value for the particular impression on behalf of the advertiser.

7. Ad Exchange Platform

In one implementation, the remote computer system can be configured to interface with an advertising exchange platform to enable matching of advertisements and/or advertising campaigns to available advertisement slots in (near) real-time. In particular, in this implementation, the remote computer system can: receive queries for advertising content for available advertisement slots loaded into webpages, accessed by a population of computing devices, via instances of a publisher portal; implement methods and techniques described above to identify target outcomes, advertisement formats, particular advertisements and/or advertising campaigns, best matched to these advertisement slots; and transmit this information to advertisers—via instances of an advertiser portal—to enable real-time bidding for these advertisement slots based on this information. The remote computer system can therefore execute Blocks of the method S100 in (near) real-time, such that advertising content (e.g., an advertisement) is loaded within an advertisement slot for viewing by a user prior to a webpage—including the advertisement slot—finishing loading on the user's computing device.

For example, the remote computer system can receive identification of a first advertisement slot loaded within a first webpage from a publisher, associated with the first webpage, via a first instance of a publisher portal. The remote computer system can then: access a first set of advertisement slot characteristics, such as an address (e.g., URL) associated with the first webpage, a location (e.g., upper, middle, lower, left, right) of the first advertisement slot within the first webpage, a time of day associated with loading of the first advertisement slot, a set of device characteristics (e.g., type of device, geographic location), and/or a set of webpage characteristics associated with the first webpage (e.g., webpage metadata); and access a set of outcome models associating advertisement slot characteristics and user interactions with advertising content, each outcome model corresponding to a target outcome, in a set of target outcomes, of advertisements (e.g., defined by advertising campaigns).

Then, for each target outcome, in the set of target outcomes, the remote computer system can: calculate an outcome score for the first advertisement slot based on the first set of advertisement slot characteristics and the outcome model, the outcome score representing a likelihood of the user interacting with advertising content, presented within the first advertisement slot, according to the target outcome; and insert the target outcome into a first outcome index sorted according to the outcome score. More specifically, in this example, the remote computer system can: access a viewability model to calculate a viewability score for the first advertisement slot based on the first set of advertisement characteristics; access a VCR model to calculate a VCR score for the first advertisement slot based on the first set of advertisement characteristics; access a brand lift model to calculate a brand lift score for the first advertisement slot based on the first set of advertisement characteristics; and so on. The remote computer system can then: compile the set of target outcomes and corresponding outcome scores (e.g., the viewability score, the VCR score, the brand lift score) into the first outcome index, sorted according to outcome score (e.g., ranked from highest score to lowest score), for the first advertisement slot; and publish the first outcome index to an advertising platform (e.g., a real-time bidding ad exchange). Advertisers may then leverage this first outcome index—accessible via instances of an advertiser portal—to inform bidding on the first advertisement slot.

In one variation, upon receiving identification of an advertisement slot from an instance of the publisher portal and characterizing the advertisement slot (e.g., based on advertisement slot characteristics), the remote computer system can serve the advertisement slot to instances of the advertiser portal. In particular, the remote computer system can sort the advertisement slot into a catalog that is searchable within the advertiser portal. For example, an advertiser may access the catalog of advertisement slots via an instance of the advertiser portal and select to view only a subset of advertisement slots, in the catalog of advertisement slots, predicted to achieve a particular target outcome. Alternatively, the advertiser may access the catalog and select to view a different subset of advertisement slots accessed by mobile devices in a particular geographic region. Therefore, the remote computer system can enable advertisers to rapidly identify advertisement slots relevant to a particular advertisement or advertising campaign and to sort advertisement slots based on preferences of the advertiser.

In one implementation, the remote computer system can rank advertisement slots for each advertisement and/or advertising campaign, live on the advertising platform, and serve these ranked advertisement slots to advertisers associated with these advertisements and/or advertising campaigns. Alternatively, in another implementation, the remote computer system can rank all advertisement slots for each advertisement and/or advertising campaign, live on the advertising platform, and then serve different sets of these ranked advertisement slots to different advertisers based on rank. For example, the remote computer system can rank all available advertisement slots for an advertising campaign associated with a particular advertiser, and serve only the top 100 advertisement slots—sorted by rank (e.g., by outcome score, based on a particular parameter specified by the advertiser)—to the particular advertiser via an instance of the advertiser portal.

In one implementation, the remote computer system can automatically push a particular advertisement slot to a target group of advertisers based on advertisement slot characteristics, characteristics of advertising campaigns and/or advertisements within advertisement campaigns, and/or advertisement slot parameters defined by advertisers. For example, the remote computer system can: receive identification of an advertisement slot loaded within a webpage; receive a set of advertisement slot characteristics corresponding to the advertisement slot; calculate a first outcome score (e.g., VCR score) for a first target outcome (e.g., VCR) for the advertisement slot based on the set of advertisement slot characteristics and the outcome model. Then, the remote computer system can: isolate a set of advertising campaigns, in a set of advertising campaigns live within the advertising platform, each advertising campaign, in the set of advertising campaigns, designating the first target outcome; and distribute the first advertisement slot—including the first outcome score for the first target outcome—to advertisers associated with each advertising campaign, in the set of advertising campaigns, via instances of the advertiser portal. The remote computer system can then repeat this process for each target outcome in the first set of target outcomes. Additionally and/or alternatively, for each advertising campaign, in the set of advertising campaigns, the remote computer system can: access a threshold outcome score defined by the advertising campaign; and, in response to the first outcome score exceeding the threshold outcome score, serve the first advertisement slot to an instance of the advertisement portal associated with the advertising campaign. Alternatively, in response to the first outcome score falling below the threshold outcome score defined by the advertising campaign, the remote computer system can withhold the first advertisement slot from the instance of the advertiser portal associated with the advertising campaign. Therefore, the remote computer system can similarly withhold particular advertisement slots from advertisers based on advertisement slot parameters (e.g., a threshold outcome score, a particular device type, a particular geographic region).

The remote computer system can streamline connecting advertisements and/or advertisement campaigns (e.g., managed by advertisers) to advertisement slots (e.g., managed by publishers) based on advertisement slot characteristics which may fit certain criteria for these advertisements and/or advertising campaigns, such as histories of high user engagement according to particular target outcome in advertisement slots exhibiting similar advertisement slot characteristics. More specifically, the remote computer system can execute Blocks of the method S100 to filter, rank, or prioritize advertisement slots served to advertisers based on advertisement slots most relevant to advertisements and/or advertisement campaigns associated with these advertisers, thereby: minimizing latency between generation of a query for advertising content in an advertisement slot and loading of an advertisement within the advertisement slot; increasing success of advertisements and/or advertising campaigns by promoting advertisement slots best matched to these advertisements and/or advertising campaigns; reducing costs to advertisers by enabling advertisers to bid on fewer advertisement slots in order to achieve target outcomes of advertising campaigns; enabling advertisers to bid relatively higher values for high-value advertisement slots (e.g., for a particular advertisement or advertising campaign) by minimizing bid placement on lower-value advertisement slots; and increasing revenue for publishers by enabling advertisers to bid higher values for these high-value advertisement slots.

8. Real-Time Advertisement Selection

In one variation, the remote computer system can execute Blocks of the method S100 to select advertisements for placement in advertisement slots in (near) real-time based on advertisement slot characteristics of these advertisement slots. For example, when a user opens a webpage loaded with an empty advertisement slot, the remote computer system can: receive a query from this advertisement slot and collect a set of advertisement slot characteristics; access the outcome model to predict user interactions with advertising content in this advertisement slot and calculate a set of outcome scores corresponding to target outcomes specified by advertisements and/or advertising campaigns; select a particular advertisement from a particular advertising campaign based on predicted user interactions and the set of outcome scores; and serve to the user the particular advertisement, in the advertisement slot, before the webpage is loaded and visible to the user.

8.1 Browse Session: Multiple Advertisement Slots

In one variation, the remote computer system can match an advertisement slot, accessed at computing device by a user, to a particular advertisement or advertising campaign based on: advertisement characteristics of the advertisement slot (e.g., URL, webpage data, device characteristics, time of day); engagement data collected by advertisements previously served to the user's computing device within a current advertisement view session—such as within the past few seconds or minutes; and target outcomes specified for various active advertisements or advertising campaigns.

In one implementation, the remote computer system can leverage engagement data, collected by one advertisement loaded in an advertisement slot on the webpage, to select another advertisement, specifying a target outcome (e.g., goal) matched to a likely behavior of the user, for insertion into another advertisement slot loaded on the webpage.

For example, a user may visit a webpage containing multiple advertisement slots, such as a first advertisement slot proximal the top of the webpage, a second advertisement slot proximal a middle of the webpage, and a third advertisement slot proximal the bottom of the webpage. Upon receipt of a request (i.e., query) for advertising content for these advertisement slots, the remote computer system can: access a set of advertisement slot characteristics for the first advertisement slot proximal the top of the webpage; and pass the set of advertisement slot characteristics into an outcome model to calculate a first set of outcome scores for the first advertisement slot, each outcome score corresponding to a particular target outcome (e.g., VCR, viewability, brand lift, conversion, quantity of scrolls, quantity of clicks), in a set of target outcomes of advertisements. Based on the set of outcome scores, the remote computer system can select a first advertisement, from a first advertising campaign specifying a first target outcome, in the set of target outcomes, for presentation within the first advertisement slot, as described above.

Once the first advertisement is loaded within the first advertisement slot, the first advertisement slot can collect and return engagement data to the remote computer system, such as in real-time at a rate of 5 Hz. The remote computer system can aggregate these data into a session container for this user during this browse session (as described in U.S. patent application Ser. No. 16/427,303). The remote computer system can then: access a second set of advertisement slot characteristics for the second advertisement slot proximal the middle of the webpage; and pass the second set of advertisement slot characteristics and the session container—representing the user's interactions with the first advertisement in the first advertisement slot—into the outcome model to calculate a second set of outcome scores for the second advertisement slot. The remote computer system can then: identify a particular advertisement—in a set of advertisements in a set of advertising campaigns that are currently active—associated with a particular target outcome that matches the most likely set of interactions of the user with advertising content in the second advertisement slot; and serve this particular advertisement to the user's computing device for immediate insertion into the second advertisement slot on the webpage before the user scrolls down to the second advertisement.

In this example, the remote computer system can repeat the foregoing process: to select a third advertisement associated with a particular target outcome matched to a most-likely set of interactions of the user engaging advertising content in the third advertisement slot, such as based on engagement data collected by both the first and second advertisements; and to return this third advertisement to the user's computing device in near real-time and before the user scrolls down to the third advertisement slot, now containing this third advertisement.

In a similar implementation, the remote computer system can leverage engagement data collected by one advertisement loaded onto a webpage accessed by a user during a browse session, to select an advertisement, specifying a target outcome matched to a likely behavior of the user, for serving to the user during this browse session, such as accessed by the user at a different webpage.

For example, the remote computer system can: receive identification of a first advertisement slot loaded on a first webpage accessed at a computing device by a user; access a first set of advertisement slot characteristics for the first advertisement slot; input the first set of advertisement slot characteristics into an outcome model to calculate a first set of outcome scores for the first advertisement slot; and select a first advertisement for insertion into the first advertisement slot based on the first set of outcome scores, as described above. Once the first advertisement is loaded into the first advertisement slot, the remote computer system can receive engagement data recorded at the first advertisement slot, such as at a rate of 5 Hz, while the user navigates through the first webpage. The remote computer system can then compile these data into a session container representing a current browse session for this user.

Then, when the user navigates to a next webpage within her web browser and the remote computer system receives a request (i.e., query) for a second advertisement for insertion into a second advertisement slot loaded in the second webpage, the remote computer system can: receive a second set of advertisement slot characteristics for the second advertisement slot; input the session container and the second set of advertisement slot characteristics into the outcome model to calculate a set of outcome scores for the user for this second advertisement slot, each outcome score representing a prediction of the user's intent to interact with advertising content (e.g., click on an advertisement, swipe an advertisement, view a video advertisement for a minimum duration) according to a target outcome, in the set of target outcomes.

Once the remote computer system thus predicts the user's intent (e.g., represented by the set of outcome scores), the remote computer system can: identify a current advertising campaign specifying a target outcome best matched (or suitably matched) to the user's intent (e.g., based on the set of outcome scores); and select a particular advertisement within this advertising campaign for the user. The remote computer system (or an advertising server, etc.) can then serve the particular advertisement to the user's computing device for insertion in the second advertisement slot. The user may thus be relatively highly likely to interact with the particular advertisement according to the target outcome.

In this variation, the remote computer system can leverage recorded engagement data for a user interacting with advertising content in one advertisement slot to predict this user's interactions with advertising content served in other advertisement slots (e.g., during one browse session for this user). However, this limited volume of engagement data for the user may enable the remote computer system to predict the user's interactions with advertising content loaded in advertisement slots with limited confidence and/or limited accuracy. Therefore, the remote computer system can leverage both advertisement slot characteristics (e.g., URL, location of advertisement slot in webpage, webpage metadata, time of day, type of device, location of device) and engagement data (e.g., from this browse session) to calculate outcome scores for a particular advertisement slot.

For example, for a particular advertisement slot, the remote computer system can: assign a high weight to limited existing engagement data of the user (e.g., stored in a session container for this browse session); assign a lower weight to historical engagement data associated with a set of advertisement slot characteristics (e.g., historical engagement data associated with the set of advertisement slot characteristics)

for this particular advertisement slot; combine these data into a composite body of engagement data; and then pass this composite body of engagement data into an outcome model to calculate a set of outcome scores for this particular advertisement slot, each outcome score representing the user's current intent to interact with advertising content in this advertisement slot according to a particular target outcome, in a set of target outcomes. The remote computer system can then implement methods and techniques described above to select a particular advertisement best matched to this particular advertisement slot, based on the user's current predicted intent and historical engagement data of other users accessing advertisement slots similar to the particular advertisement slot accessed by the user.

The remote computer system can similarly leverage user engagement data to calculate outcome scores for other advertising variables for a particular advertisement slot, such as: advertisements; advertising campaigns; advertisement formats; advertisement creative; etc. Additionally, the remote computer system can calculate outcome scores for any combination of these advertising variables.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   via a computer network, receiving identification of a first advertisement slot loaded within a first webpage accessed at a computing device by a user;
   receiving a first set of advertisement slot characteristics corresponding to the first advertisement slot, the first set of advertisement slot characteristics comprising a first address of the first webpage;
   accessing a first set of webpage data, stored in a webpage container, corresponding to the first webpage based on the first address;
   accessing a catalog of advertisements assigned to a set of webpages comprising the first webpage, each advertisement in the catalog of advertisements defining a target outcome, in a set of target outcomes, representative of a set of target interactions for users interacting with the advertisement;
   accessing a model associating advertisement slot characteristics and webpage data to the set of target outcomes;
   for each target outcome, in the set of target outcomes:
      calculating an outcome score for the first advertisement slot, loaded within the first webpage, based on the first set of advertisement slot characteristics, the first set of webpage data, and the model, the outcome score representing a probability of the user interacting with advertising content, presented within the first advertisement slot, according to the target outcome; and
      storing the outcome score in a first set of outcome scores, associated with the set of target outcomes, for the first advertisement slot; and
   writing the first set of outcome scores to a first advertisement slot container corresponding to the first advertisement slot;
   in response to a first outcome score, in the first set of outcome scores, exceeding each other outcome score in the first set of outcome scores:
      designating the first advertisement slot for presentation of advertising content specifying a first target outcome, in the set of target outcomes, corresponding to the first outcome score; and
      selecting a first advertisement, in the catalog of advertisements, specifying the first target outcome, for presentation within the first advertisement slot;
   in response to serving the first advertisement to the first advertisement slot:
      receiving a first set of engagement data representing user interactions with the first advertisement, presented within the first advertisement slot;
      for each target outcome, in the set of target outcomes:
         calculating an actual outcome score for the first advertisement slot, containing the first advertisement, based on the first set of engagement data; and
         inserting the actual outcome score into a first set of actual outcome scores for the first advertisement slot; and
      writing the first set of actual outcome scores to the first advertisement slot container; and
      storing the first advertisement slot container in the first set of webpage data, stored within the webpage container, corresponding to the first webpage.

2. The method of claim 1, further comprising, over a first period of time:
   serving advertising content in advertisement slots inserted into the set of webpages accessed by a population of computing devices associated with a population of users;
   receiving a corpus of advertisement slot characteristics associated with advertisement slots inserted into the set of webpages and accessed by the set of computing devices;
   receiving a corpus of engagement data representing interactions of the population of users with advertising content presented within advertisement slots accessed by the set of computing devices; and
   generating the model linking advertisement slot characteristics to target outcomes of advertising content based on the corpus of engagement data and the corpus of advertisement slot characteristics.

3. The method of claim 1:
   wherein receiving identification of the first advertisement slot loaded within the first webpage accessed at the computing device comprises receiving identification of the first advertisement slot loaded within the first webpage accessed at the computing device at a first time;

wherein receiving the first set of advertisement slot characteristics comprising the first address of the first webpage comprises receiving the first set of advertisement slot characteristics comprising the first address of the first webpage, a first location of the first advertisement slot within the first webpage, and a first set of device characteristics corresponding to the computing device, the first set of device characteristics comprising:
- a first device type of the computing device;
- a first geographic location of the computing device; and
- a timestamp corresponding to the first time.

4. The method of claim 1:

wherein calculating the outcome score for the first advertisement slot for each target outcome, in the set of target outcomes comprises calculating the first outcome score for the first target outcome comprising video completion rate, the first outcome score representative of a probability of the user viewing a minimum proportion of a duration of video advertising content, presented within the first advertisement slot;

wherein inserting the outcome score into the first set of outcome scores, for each target outcome in the set of target outcomes comprises inserting the first outcome score into the first set of outcome scores;

wherein assigning the first target outcome to the first advertisement slot in response to the first target outcome score exceeding each other outcome score in the first set of outcome scores comprises assigning the first target outcome comprising video completion rate to the first advertisement slot in response to the first outcome score, corresponding to video completion rate, exceeding each other outcome score in the first set of outcome scores; and wherein selecting the first advertisement designating the first target outcome comprises selecting the first advertisement designating video completion rate.

5. The method of claim 1:

wherein calculating the outcome score for the first advertisement slot for each target outcome, in the set of target outcomes, comprises:
- calculating the first outcome score for the first target outcome comprising viewability; and
- calculating a second outcome score for a second target outcome comprising brand lift; and wherein designating the first advertisement slot for presentation of advertising content specifying the first target outcome in response to the first outcome score exceeding each other outcome score, in the first set of outcome scores, comprises designating the first advertisement slot for presentation of advertising content specifying the first target outcome of viewability in response to the first outcome score, corresponding to the first target outcome of viewability, exceeding the second outcome score corresponding to brand lift.

6. The method of claim 5:

wherein selecting the first advertisement designating the first target outcome comprises selecting the first advertisement designating the first target outcome comprising viewability and defining a first advertisement format responsive to scroll; and further comprising, in response to the second outcome score corresponding to brand lift exceeding the first outcome score corresponding to viewability:

- assigning brand lift to the first advertisement slot; and
- selecting a second advertisement, in the catalog of advertisements, designating brand lift and defining a second advertisement format defining a banner advertisement.

7. The method of claim 1:

wherein assigning the first target outcome to the first advertisement slot in response to the first outcome score exceeding each other outcome score in the first set of outcome scores comprises designating the first target outcome as a primary target outcome assigned to the first advertisement slot in response to the first outcome score exceeding each other outcome score in the first set of outcome scores;

further comprising, in response to assigning the first target outcome as the primary target outcome assigned to the first advertisement slot:
- isolating a subset of advertisements, in the catalog of advertisements, designating the first target outcome, the subset of advertisements comprising the first advertisement; and
- in response to a second outcome score, in the first set of outcome scores, exceeding each other outcome score in the first set of outcome scores, excluding the first outcome score, designating the second target outcome as a secondary target outcome assigned to the first advertisement slot; and wherein selecting the first advertisement, in the catalog of advertisements, designating the first target outcome, for presentation within the first advertisement slot, further comprises, selecting the first advertisement, in the first subset of advertisements, designating the first target outcome and the second target outcome, for presentation within the first advertisement slot.

8. The method of claim 1:

wherein selecting the first advertisement for presentation within the first advertisement slot comprises:
- identifying a first subset of advertisements, in the catalog of advertisements, designating the first target outcome, the first subset of advertisements comprising the first advertisement; and
- accessing a first set of advertisement data, stored in an advertisement container, corresponding to the first advertisement;
- calculating an adjusted outcome score for the first advertisement slot based on the first set of advertisement slot characteristics, the first set of webpage data, the first set of advertisement data and the model, the adjusted outcome score representative of a probability of user engagement with the first advertisement, presented within the first advertisement slot, according to the first target outcome; and
- in response to the adjusted outcome score exceeding a threshold outcome score, selecting the first advertisement for presentation within the first advertisement slot.

9. The method of claim 8, wherein accessing the first set of advertisement data corresponding to the first advertisement comprises accessing the first set of advertisement data comprising:
- a format of the first advertisement;
- a subject of the first advertisement; and
- a set of engagement data representing historical user interactions with the first advertisement and comprising historical outcomes associated with presenting the first advertisement in advertisement slots and corresponding advertisement slot characteristics of advertisement slots loaded with the first advertisement.

10. The method of claim 1:
wherein receiving identification of the first advertisement slot loaded within the first webpage further comprises receiving identification of the first advertisement slot and a second advertisement slot loaded within the first webpage;
wherein receiving the first set of advertisement slot characteristics comprises receiving the first address of the first webpage and a first location of the first advertisement slot within the first webpage;
further comprising:
receiving a second set of advertisement slot characteristics corresponding to the second advertisement slot, the second set of advertisement slot characteristics comprising the first address of the first webpage and a second location of the second advertisement slot within the first webpage; and
for each target outcome, in the set of target outcomes:
calculating an outcome score for the second advertisement slot based on the second set of advertisement slot characteristics, the first set of webpage data, and the model, the outcome score representing a probability of the user interacting with advertising content, presented within the second advertisement slot, according to the target outcome; and
storing the outcome score in a second set of outcome scores, associated with the set of target outcomes, for the second advertisement slot; and
wherein designating the first advertisement slot for presentation of advertising content specifying the first target outcome, corresponding to the first outcome score, in response to the first outcome score exceeding each other outcome score, in the first set of outcome scores, comprises:
in response to the first outcome score exceeding each other outcome score, in the first set of outcome scores, assigning the first target outcome, linked to the first outcome score, to the first advertisement slot;
in response to a second outcome score, in the second set of outcome scores, exceeding each other outcome score in the second set of outcome scores, assigning the second target outcome, linked to the second outcome score, to the second advertisement slot;
calculating a composite outcome score based on a combination of the first outcome score of the first advertisement slot and the second outcome score of the second advertisement slot; and
in response to the composite outcome score exceeding a threshold outcome score:
designating the first advertisement slot for presentation of advertising content specifying the first target outcome; and
designating the second advertisement slot for presentation of advertising content specifying the second target outcome.

11. A method comprising:
via a computer network, receiving identification of a first advertisement slot loaded within a first webpage accessed at a computing device by a user;
receiving a first set of advertisement slot characteristics comprising a first address of the first webpage and a first location of the first advertisement slot within the first webpage;
accessing a model associating advertisement slot characteristics and user interactions with a set of advertisements in a first advertising campaign;
for a first advertisement, in the first advertising campaign:
accessing a first set of advertisement characteristics stored in a first advertisement container corresponding to the first advertisement, the first set of advertisement characteristics comprising a first advertisement format of the first advertisement; and
calculating a first outcome score for the first advertisement based on the first set of advertisement slot characteristics, the first set of advertisement characteristics, and the model, the first outcome score representing a probability of the user interacting with the first advertisement, presented within the first advertisement slot, according to a first target outcome defined by the first advertising campaign;
for a second advertisement, in the first advertising campaign:
accessing a second set of advertisement characteristics stored in a second advertisement container corresponding to the second advertisement, the second set of advertisement characteristics comprising a second advertisement format of the second advertisement; and
calculating a second outcome score for the second advertisement based on the first set of advertisement slot characteristics, the second set of advertisement characteristics, and the model, the second outcome score representing a probability of the user interacting with the second advertisement, presented within the first advertisement slot, according to the first target outcome; and
in response to the first outcome score exceeding the second outcome score, selecting the first advertisement for presentation within the first advertisement slot accessed by the computing device;
storing the first outcome score and the second outcome score in a first ranked outcome list for the first advertisement slot loaded within the first webpage;
writing the first ranked outcome list to a first advertisement slot container corresponding to the first advertisement slot;
storing the first advertisement slot container in a webpage container corresponding to the first webpage; and
in response to selecting the first advertisement for presentation within the first advertisement slot:
receiving a first set of engagement data representing user interactions with the first advertisement, presented within the first advertisement slot;
calculating an actual outcome score for the first advertisement slot, containing the first advertisement, based on the first set of engagement data; and
inserting the actual outcome score in the first ranked outcome list.

12. The method of claim 11, wherein selecting the first advertisement for presentation within the first advertisement slot in response to the first outcome score exceeding the second outcome score comprises:
in response to the first outcome score exceeding the second outcome score and in response to the first outcome score falling below a threshold outcome score:
withholding the first advertisement from presentation within the first advertisement slot; and
selecting a third advertisement, in the first advertising campaign, for presentation within the first advertisement slot; and in response to the first outcome score exceeding the second outcome score and in response to the first outcome score exceeding the threshold outcome score, selecting the first advertisement for presentation within the first advertisement slot.

13. The method of claim 11:
wherein accessing the first set of advertisement characteristics comprising the first advertisement format comprises accessing the first set of advertisement characteristics comprising the first advertisement format comprising a digital video responsive to scroll inputs entered by the user;
wherein accessing the second set of advertisement characteristics comprising the second advertisement format comprises accessing the second set of advertisement characteristics comprising the second advertisement format comprising an image comprising a set of selectable regions responsive to click inputs entered by the user;
wherein calculating the first outcome score for the first advertisement based on the first set of advertisement slot characteristics, the first set of advertisement characteristics, and the model, comprises:
predicting a quantity of scrolls over the first advertisement based on the first set of advertisement slot characteristics, the first set of advertisement characteristics, and the model;
accessing a target quantity of scrolls associated with a minimum brand lift; and
calculating the first outcome score for the first advertisement based on the quantity of scrolls and the target quantity of scrolls; and
wherein calculating the second outcome score for the second advertisement based on the first set of advertisement slot characteristics, the second set of advertisement characteristics, and the model, comprises:
predicting a quantity of clicks at selectable regions, in the set of selectable regions, of the second advertisement based on the first set of advertisement slot characteristics, the second set of advertisement characteristics, and the model;
accessing a target quantity of clicks associated with the minimum brand lift; and
calculating the second outcome score for the second advertisement based on the quantity of clicks and the target quantity of clicks.

14. The method of claim 11:
wherein receiving identification of the first advertisement slot loaded within the first webpage comprises, at a first time, receiving identification of the first advertisement slot loaded within the first webpage;
wherein selecting the first advertisement for presentation within the first advertisement slot comprises, at a second time succeeding the first time, selecting the first advertisement for presentation within the first advertisement slot accessed by the computing device; and
further comprising:
at a third time succeeding the second time, accessing a first set of engagement data representative of user interactions with the first advertisement presented within the first advertisement slot on the first webpage;
calculating an actual outcome score for the first advertisement, presented within the first advertisement slot, based on the first set of engagement data;
characterizing a difference between the first outcome score and the actual outcome score; and
rectifying the model based on the difference.

15. A method comprising:
via a computer network, receiving identification of a first advertisement slot loaded within a first webpage accessed at a computing device by a user;
receiving a first set of advertisement slot characteristics comprising a first address of the first webpage and a first device characteristic corresponding to the computing device;
accessing a first set of engagement data associated with the first address of the first webpage, the first set of engagement data representative of user interactions with advertising content rendered within advertisement slots loaded within webpages accessed at the first address;
for each target outcome, in a set of target outcomes:
accessing an outcome model, in a set of outcome models, associating advertisement slot characteristics and user interactions with advertisements and corresponding to the target outcome;
calculating an outcome score for the first advertisement slot based on the first set of advertisement slot characteristics, the first set of engagement data, and the outcome model, the outcome score representing a probability of the user interacting with advertising content, presented within the first advertisement slot, according to the target outcome; and
inserting the target outcome into a first outcome index ranked according to the outcome score; and
publishing the first outcome index to an advertising platform, the first outcome index comprising a set of target outcome and outcome score pairs;
writing the first outcome index to a first advertisement slot container corresponding to the first advertisement slot;
storing the first advertisement slot container in a webpage container, in a set of webpage containers, corresponding to the first webpage;
in response to serving a first advertisement to the first advertisement slot for presentation to the user:
receiving a second set of engagement data representing user interactions with the first advertisement presented within the first advertisement slot;
for each target outcome in the set of target outcomes:
calculating an actual outcome score for the first advertisement slot, containing the first advertisement, based on the second set of engagement data; and
inserting the actual outcome score into the first outcome index for the first advertisement slot.

16. The method of claim 15:
wherein accessing the outcome model associating advertisement slot characteristics and user interactions with advertisements and corresponding to the target outcome, for each target outcome in the set of target outcomes, comprises:
accessing a first outcome model associating advertisement slot characteristics and user interactions with advertisements and corresponding to a first target outcome associated with video completion rate;
accessing a second outcome model associating advertisement slot characteristics and user interactions with advertisements and corresponding to a second target outcome associated with viewability;
wherein calculating the outcome score representing a probability of the user interacting with advertising content, presented within the first advertisement slot, according to the target outcome, for each target outcome in the set of target outcomes comprises:
  calculating a first outcome score representing a probability of the user interacting with advertising content, presented within the first advertisement slot, according to the first target outcome; and
  calculating a second outcome score representing a probability of the user interacting with advertising content, presented within the first advertisement slot, according to the second target outcome;
wherein inserting the target outcome into the first outcome index according to the outcome score, for each target outcome in the set of target outcomes, comprises:
  initializing the first outcome index for the first advertisement slot;
  inserting a first target outcome and outcome score pair into the first outcome index according to the first outcome score, the first target outcome and outcome score pair comprising the first target outcome paired with the first outcome score; and
  inserting a second target outcome and outcome score pair into the first outcome index according to the second outcome score, the second target outcome, and outcome score pair comprising the second target outcome paired with the second outcome score; and
wherein serving the first outcome index to the advertising platform, the first outcome index comprising the set of target outcome and outcome score pairs, comprises publishing the first outcome index to the advertising exchange platform, the first outcome index comprising the set of target outcome and outcome score pairs comprising the first target outcome and outcome score pair and the second target outcome and outcome score pair, sorted according to outcome score.

17. The method of claim 15:
wherein receiving identification of the first advertisement slot loaded within the first webpage comprises receiving identification of the first advertisement slot loaded within the first webpage from an instance of a publisher portal via an advertisement slot identification module;
wherein receiving the first set of advertisement slot characteristics comprises receiving the first set of advertisement slot characteristics from the instance of the publisher portal via an advertisement slot characterization module;
wherein accessing the first set of engagement data associated with the first address comprises accessing the first set of engagement data associated with the first address via an engagement data extraction module;
wherein accessing the outcome model corresponding to the target outcome comprises accessing the outcome model corresponding to the target outcome via a model extraction module;
wherein calculating the outcome score for the first advertisement slot comprises calculating the outcome score for the first advertisement slot via an outcome score generation module;
wherein inserting the target outcome into the first outcome index comprises inserting the target outcome into the first outcome index via an outcome index generation module; and
wherein publishing the first outcome index to the advertising platform comprises publishing the first outcome index to the advertising platform accessible to a set of instances of an advertiser portal.

* * * * *